(12) United States Patent
Colpitts et al.

(10) Patent No.: US 7,480,460 B2
(45) Date of Patent: Jan. 20, 2009

(54) DYNAMIC STRAIN DISTRIBUTED FIBER OPTIC SENSOR

(75) Inventors: Bruce G. Colpitts, Fredericton (CA); Anthony W. Brown, Fredericton (CA)

(73) Assignee: University of New Brunswick, Fredericton, New Brunswick (CA)

( * ) Notice: Subject to any disclaimer, the term of this patent is extended or adjusted under 35 U.S.C. 154(b) by 467 days.

(21) Appl. No.: 11/391,676

(22) Filed: Mar. 29, 2006

(65) Prior Publication Data
US 2006/0285850 A1  Dec. 21, 2006

Related U.S. Application Data

(60) Provisional application No. 60/665,860, filed on Mar. 29, 2005.

(51) Int. Cl.
*H04B 10/00* (2006.01)
(52) U.S. Cl. .................. 398/108; 398/21; 398/25
(58) Field of Classification Search .......... 398/21, 398/25, 48, 108
See application file for complete search history.

(56) References Cited

U.S. PATENT DOCUMENTS

| 5,818,585 A | 10/1998 | Davis et al. |
| 6,674,928 B2 | 1/2004 | Johnson et al. |

*Primary Examiner*—Dzung D Tran
(74) *Attorney, Agent, or Firm*—Eugene F. Derényi

(57) ABSTRACT

A distributed fiber optic sensor simultaneously interrogates the sensing fiber with two counter propagating light beams. One beam is set to a constant frequency. The second beam is modified to contain a "comb" of frequencies, with each frequency component in the comb offset by a predetermined amount. Each of the frequency components in the comb, herein referred to as teeth, is able to interact with the counter-propagating beam through the Brillouin scattering process. With proper selection of the comb characteristics such as the number of teeth, the frequency spacing of teeth, the spectral width of teeth, and the relative amplitude of the teeth, a representation of the Brillouin spectrum at each point in the fiber can be obtained simultaneously with a single pass through the fiber.

22 Claims, 23 Drawing Sheets

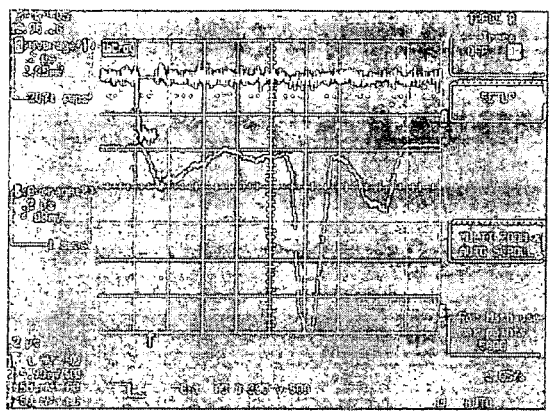 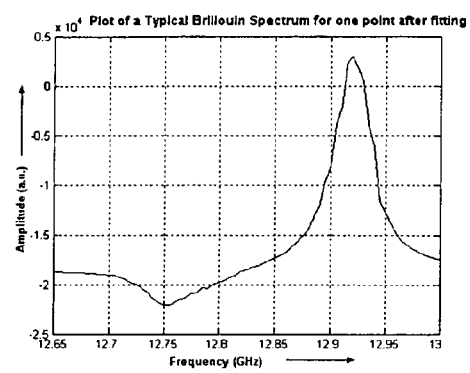
FIG. 2a                                           FIG. 2b

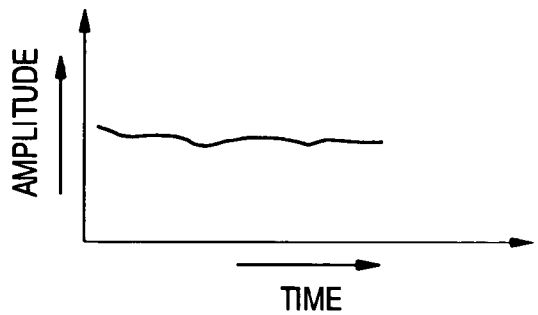
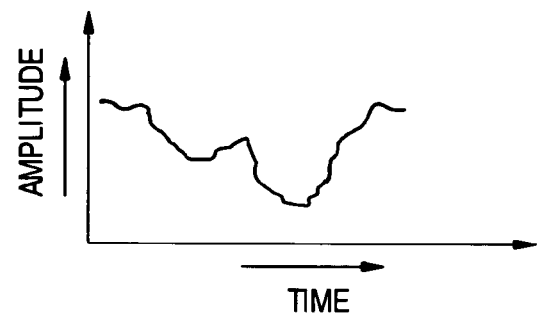
FIG. 3(a)   FIG. 3(b)
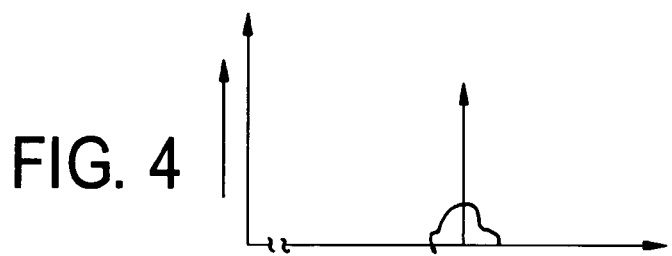
FIG. 4
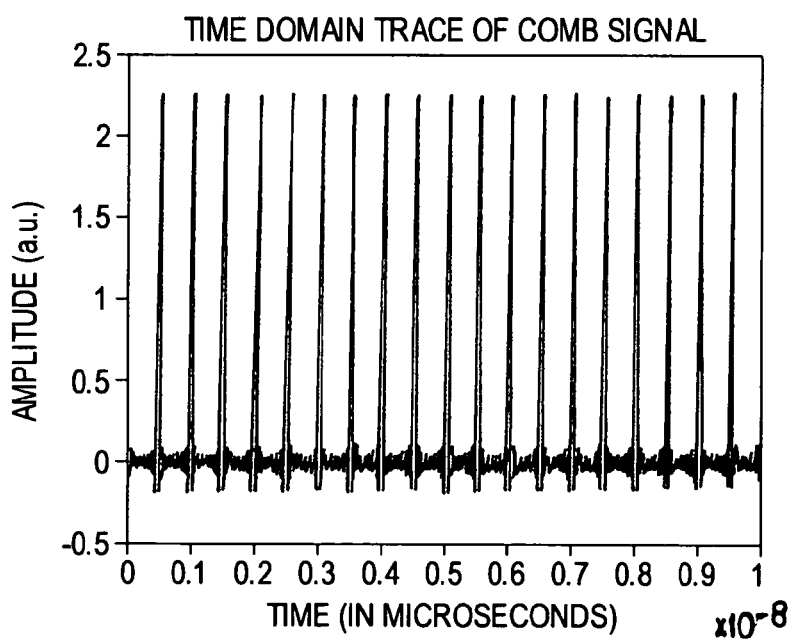
FIG. 5

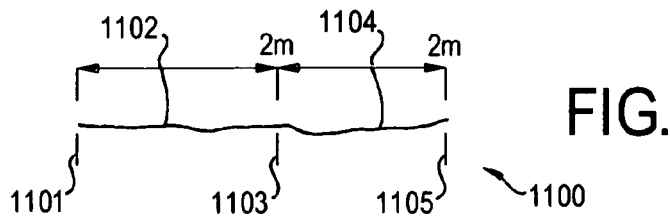
FIG. 11(a)
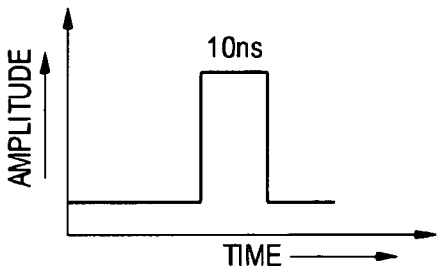
FIG. 11(b)
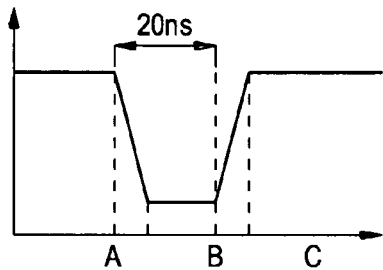
FIG. 11(c)
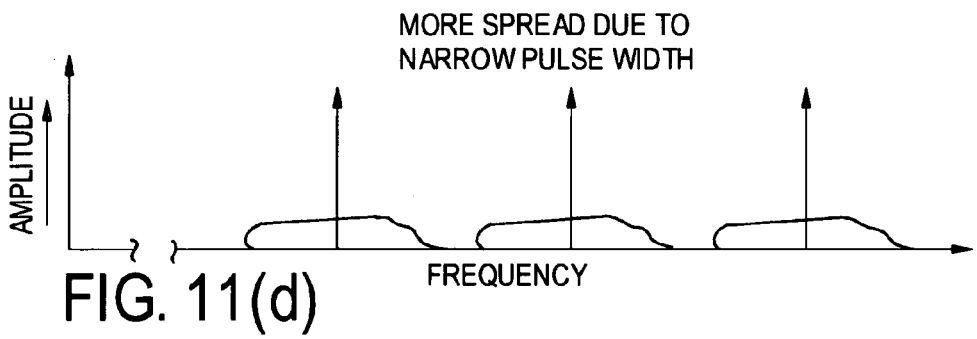
FIG. 11(d)
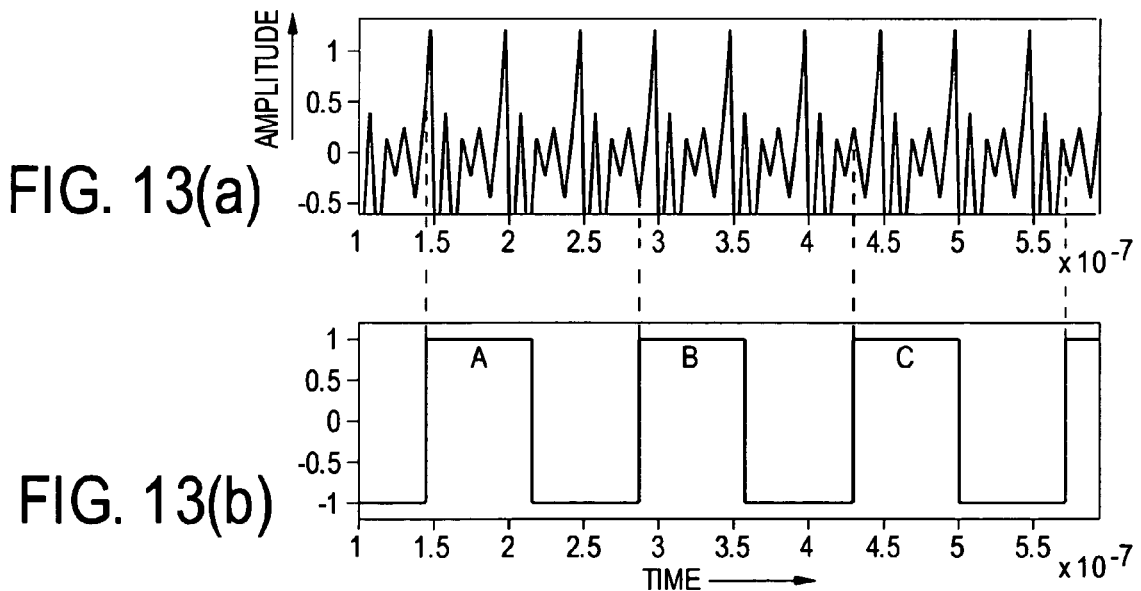
FIG. 13(a)
FIG. 13(b)

PM WAVEFORM WITH CARRIER FREQUENCY 1000MHz AND MODULATING SIGNAL CONSISTING OF 12 COMB TEETH SEPARATED BY 10 MNz (ZOOMED IN VIEW)

FIG. 17
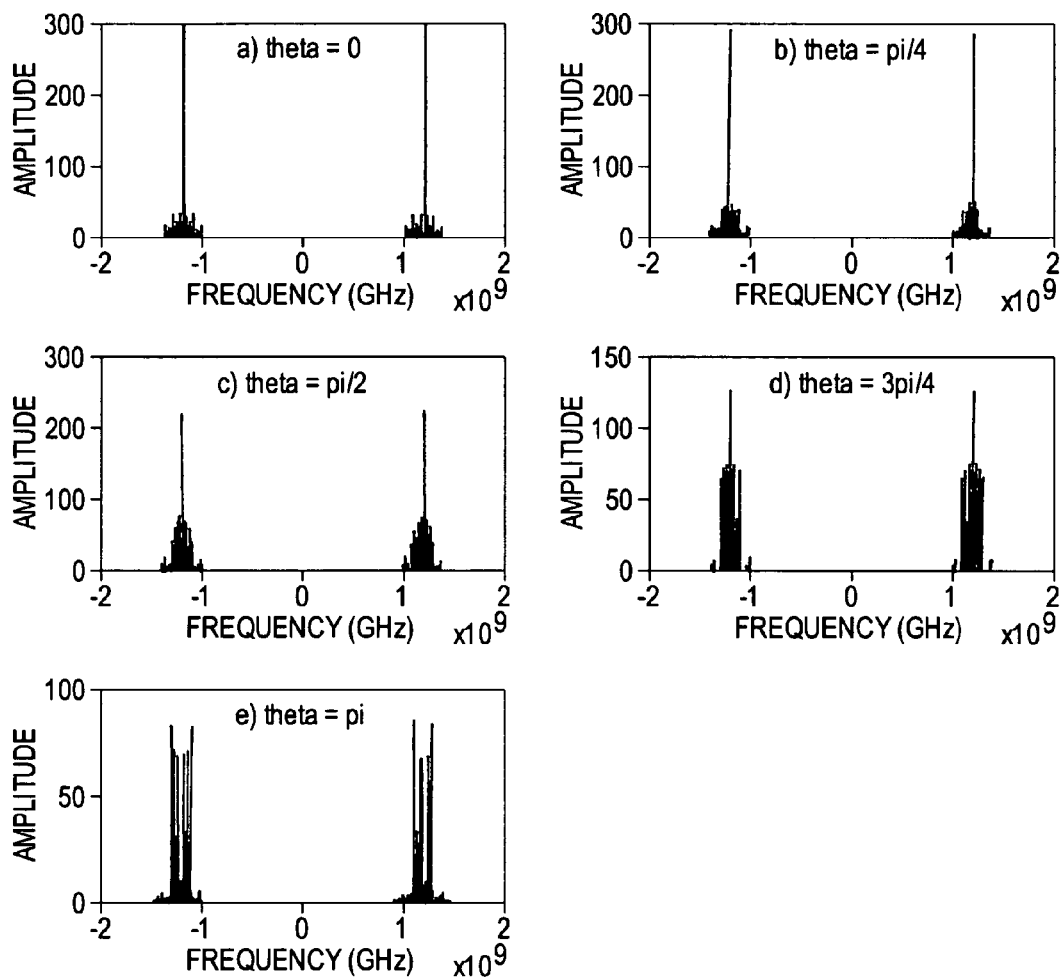
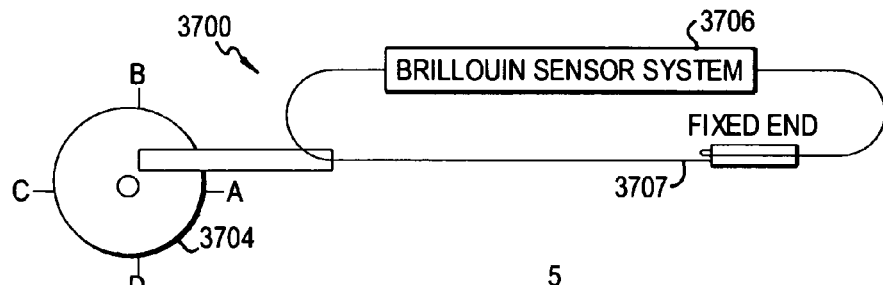
FIG. 37
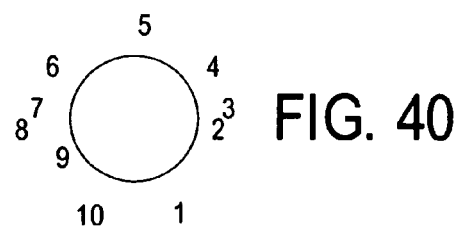
FIG. 40

FIG. 22
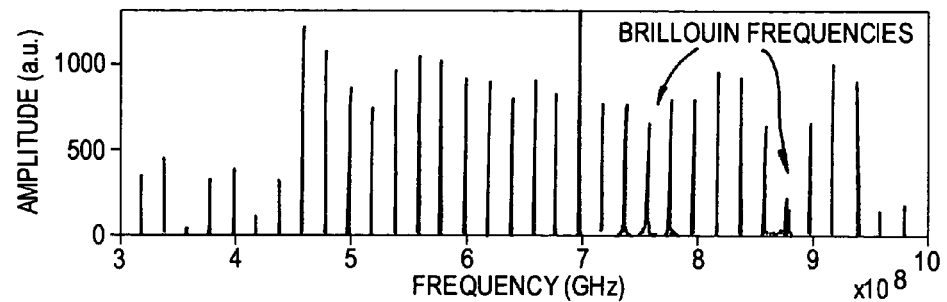
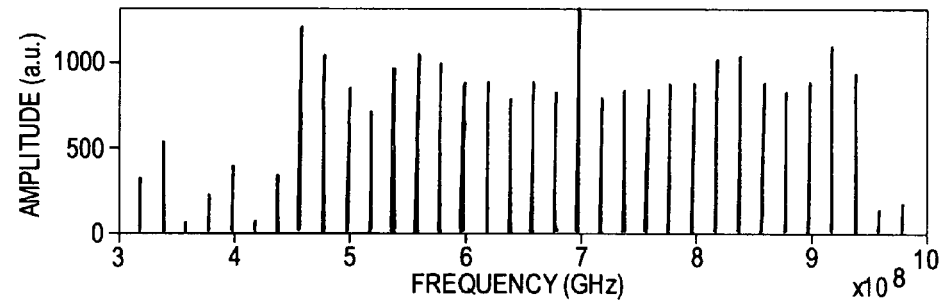
FIG. 26
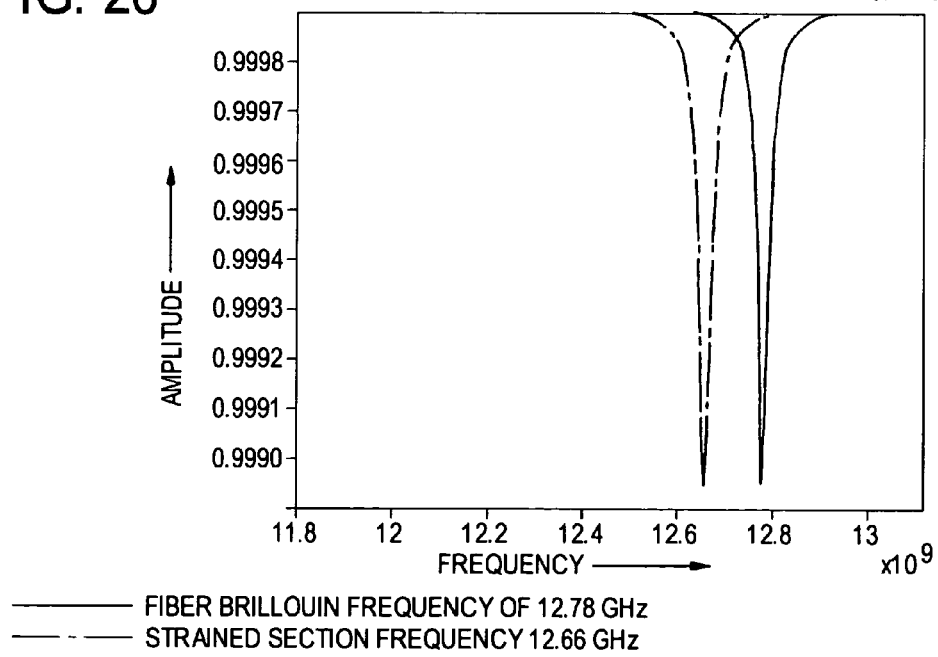

BRILLOUIN FREQUENCY OF POINTS
(STATIC CASE)

——— DIRECT DETECTION PLOTS
- - - - CPR PLOTS (STATIC)

DYNAMIC STRAIN DISTRIBUTED FIBER OPTIC SENSOR

REFERENCE TO RELATED APPLICATION

The present application claims the benefit of U.S. Provisional Patent Application No. 60/665,860, filed Mar. 29, 2005, whose disclosure is hereby incorporated in its entirety into the present application.

FIELD OF THE INVENTION

The present invention is directed to a method of measuring physical characteristics, particularly but not exclusively strain, displacement and temperature, and in particular a method based on the measurement and analysis of the Brillouin scattering spectrum in optical fiber. The present invention is further directed to a distributed fiber optic sensing system for use in rapidly measuring such physical characteristics at a fast measurement rate.

DESCRIPTION OF RELATED ART

The use of fiber optic technology for sensing environmental and structural properties is well known in many industries where it provides meaningful information to help ensure safety and efficiency of operation. Fiber optic sensors can be deployed in many ways such as being applied to the surface of structures, embedded in materials, buried underground, etc. In situations where relatively large areas require monitoring, distributed sensing techniques are often used to gather information.

Many different techniques exist for using fiber optic technology for sensing applications. The application of Brillouin scattering to distributed fiber optic sensing has been successfully researched and developed by several academic and industry organizations. Brillouin scattering is known in the art to have well-defined thermal and mechanical dependencies. Measuring the spectrum of the Brillouin process in a distributed fashion allows for physical characteristics to be determined.

Brillouin scattering is a non-linear process that occurs through the generation of a backward propagating Stokes wave, which is downshifted in frequency from the original wave by an amount determined by the non-linear medium. The Brillouin spectrum has a Lorentzian profile centered about the Brillouin frequency of the fiber. However, this frequency is sensitive to strain and temperature, and changes in a linear fashion in response to both. Strain and temperature distribution along the fiber can be obtained by measuring the frequency shift as a function of location.

This principle was first applied to sensing in 1989. A pump pulse was launched into one end of a fiber and a cw probe was launched into the other side. When the frequency difference between the two waves equaled the Brillouin frequency for a particular location on the fiber, the cw experienced gain at that location. In this way the frequency difference was stepped over a range of values to get the overall Brillouin spectrum. The temperature accuracy was 3° C., with spatial resolution of 100 m on a 1200 m fiber.

To increase the overall sensing length of BOTDA, Bao et al. proposed a method based on Brillouin loss signal rather than the gain. Unlike the previous case, now the frequency of the probe was greater than the frequency of the pulse. As a result, the pump experienced amplification and the probe experienced loss. This resulted in longer sensing lengths because the pump did not experience depletion. Bao et al. demonstrated a temperature resolution of one degree Celsius and a spatial resolution of 10 meters on a 50 km fiber.

The next major development was the single-ended BOTDA system developed by the research group at Swiss Federal Institute of Technology (EPFL). In this, an Electro Optic Modulator connected to a microwave source generates upper and lower sidebands along with pulses. This frequency shifted pulse interacts with the reflected cw wave from the far end of the fiber to produce Brillouin scattering. A temperature resolution of 1° C. and a strain up to 20 µε with a 1 m spatial resolution on fibers 10 km in length has been demonstrated.

Dynamic strain is an emerging area of research for applications in civil and aerospace structures like structural fatigue evaluation due to material aging (reference), and also wind induced vibrations of optical fiber composite overhead ground wire.

One of the major applications of this would be in intrusion detection of pipelines caused by third party damage. Gas pipelines are several hundred km long and sometimes they are damaged by construction equipment like boring and drilling machines. Current methods which include periodic aerial surveillance, using satellite images, acoustic methods etc. require too much human intervention and their reliability is dependant on climatic conditions. When the construction equipment is near, an optical fiber sensor buried with the pipeline would undergo stress due to the vibrations and compressions of the surrounding soil. This change could be detected using the principle of BOTDA. This would allow continuous, real time monitoring of pipelines and alert the authorities even before the damage is caused, thereby saving millions of dollars. However, this system should be able to distinguish between vibrations caused by normal conditions like an overhead passing train, lawn mowing etc. and potentially hazardous equipment.

The Brillouin signal has low SNR and hence averaging is usually required to obtain the fiber information. Also, to cover the entire spectrum, the frequency difference between the two lasers has to be stepped through various values and a measurement has to be taken each time. These result in measurement times in the range of minutes for BOTDA based systems, whereas, systems based on other properties like Polarization Optical Time Domain Reflectometry, Optical Coherence Domain Reflectometry, and Frequency Modulated Continuous Wave Techniques require measurement times in the millisecond range. However, the ratio of the spatial resolution to the measurement range is as low as 0.01% for BOTDA (relative spatial resolution range) which is very good compared to other schemes.

Brillouin ring amplification was first proposed for dynamic strain measurement. This measured dynamic strain having a period of 2 s, but the spatial resolution was ≈100 m. Dynamic strain measurement at 1 Hz was also made using a correlation based technique. However, the vibrating section was only 5 cm long. Measurements for pipeline intrusion detection were made using a modified OTDR method leading load variations detection upto 5 Hz.

When light travels through a fiber, it interacts with matter and undergoes scattering. This results in conversion of light from one frequency to another through the emission (Stokes process) or absorption (Anti-Stokes process) of acoustic phonons. The number of photons scattered per mode length is given by:

$$\frac{dN_S}{dz} = AN_I(N_S + 1) \quad (2.1)$$

where $N_S$, and $N_I$ are the number of scattered and incident photons, A is the gain factor.

If the incident light intensity is weak, then the number of scattered photons per mode is small ($N_S \ll 1$), then the above equation is approximated by a linear equation:

$$N_S = AN_I l \quad (2.2)$$

This is known as spontaneous scattering.

However, as the intensity of the incident light increases, a large number of scattered photons are generated ($N_S \gg 1$) and equation (2.1) becomes:

$$N_S = N_S(0) \exp(AN_I l) \quad (2.3)$$

This will lead to an exponential or stimulated amplification of scattered light.

Brillouin scattering is caused by the vibrations of the molecular structure of glass which in turn leads to refractive index variations. These vibrations are termed as acoustic phonons and travel at the speed of sound ($V_A$) and cause a frequency shift in the pump light due to Doppler effect:

$$v_B = \frac{2nV_A}{\lambda} \quad (2.4)$$

This is termed as the Brillouin frequency shift. This shift is dependent on the refractive index (n) and acoustic velocity ($V_A$) of the fiber, both of which are in turn related to the strain and temperature of the fiber and this phenomenon is exploited in strain and temperature sensing.

However, this scattering does not occur at one particular frequency only. Instead it is spread over a range due to the finite lifetime of acoustic phonons (typically 10 ns). The decay process is assumed to be exponential resulting in a Lorentzian Brillouin profile:

$$g(v) = \frac{g_B}{1 + 4\left[\frac{v - v_B}{\Delta v_B}\right]} \quad (2.5)$$

where $g_B$ is the peak value of the Brillouin gain occurring at $v = v_B$. $\Delta v_B$ is the Brillouin line width (of the order of 30 MHz).

The Stokes process is observed more commonly as compared to the anti-Stokes process. It results in the creation of acoustic phonons which further stimulate scattering. However, the incident light intensity has to be greater than a threshold value to allow for stimulated scattering to occur. This threshold is the value of the pump intensity at which the gain of the Stokes wave overcomes the fiber loss. This value can be reached at lasers powers as low as a few mill watts because of the high power densities in the small core fiber as well as the low loss of modern fibers.

BOTDA based systems work on the principle of Brillouin amplification. They consist of two lasers injecting light from opposite ends of the fiber at frequencies $v_1$ (probe laser) and $v_2$ (pump laser). The frequencies of the lasers are adjusted such that $v_2 = v_1 + v_B$. This results in the probe light having the same frequency as that of the Brillouin scattered light generated by the pump laser. The probe intensity is thus added to the pump scattering intensity resulting in stimulated scattering of the pump. The net result is that the pump undergoes loss and the probe beam undergoes gain.

In real systems, the value of the Brillouin frequency is not known beforehand. Hence, the frequency difference of the two lasers is scanned through a range of values and at each value the gain/loss of the probe/pump is measured. This can in turn be used to construct the Brillouin spectrum g(v) and from this the Brillouin frequency can be determined.

In U.S. Pat. Nos. 6,813,403, 6,380,534, and 5,880,463, the authors teach various methods of fiber optic sensing using the Brillouin scattering process. These techniques differ in the means by which they interrogate the optical fiber to determine its thermal and mechanical properties in a distributed manner. However they are all similar with respect to how each relies on the interaction between two counter propagating light beams of different frequency in the fiber. To provide spatial information, it is common to pulse one of the laser beams in order define a characteristic sensing length and to enable the extraction of spatially-resolved Brillouin spectrum information through optical time domain analysis. Furthermore, the techniques taught in the art are similar in how they rely on a sequential, iterative process of varying the relative frequency difference between the counter propagating light beams in order to determine the spectrum of the Brillouin scattering process throughout the fiber. With knowledge of the spectrum, the fiber's strain and temperature properties can be determined. The use of a sequential, iterative procedure for varying the frequency difference results in a time-consuming measurement process. As the length of sensing fiber increases and the range of possible strain and temperature conditions increase, the time required to collect a complete measurement grows rapidly and ability to measure dynamic physical processes decreases. In situations where dynamic measurements are required, such as for monitoring vibrations, the previously described methods that exist in the prior art are not able to provide sufficiently rapid measurement rates.

In U.S. Pat. Nos. 5,818,585, 6,674,928, the authors teach methods of using a collection of discrete optical sensing points, referred to in the art as fiber Bragg gratings (FBGs), in an optical fiber to collect strain and/or temperature measurements along said optical fiber. Although this technique offers dynamic measurement capabilities, it suffers from several limitations. First, sensing elements must be introduced at discrete points in the fiber. This process often degrades said fiber's mechanical strength and increases the overall cost of the length of sensing fiber. Second, there are practical limits to the total number of FBG sensors that can be applied to the sensing fiber. This limitation can reduce the maximum length of sensing fiber and can result in large distances between discrete FBG sensing points.

SUMMARY OF THE INVENTION

The present invention teaches an improved method of distributed sensing with Brillouin scattering that allows for significantly shorter measurement times, thereby providing the capability to monitor dynamic processes.

The present invention provides a distributed fiber optic based sensor system using Brillouin scattering that overcomes the previously described limitations of all known systems that use the Brillouin scattering process by allowing for rapid measurements of the Brillouin spectrum using a single pass of light through the fiber.

This invention employs a novel technique for simultaneously interrogating the sensing fiber with two counter propagating light beams. One beam is set to a constant frequency, consistent with prior art. The second beam is modified to contain a "comb" of frequencies, with each frequency component in the comb offset by a predetermined amount. Each of the frequency components in the comb, herein referred to as teeth, is able to interact with the counter-propagating beam through the Brillouin scattering process. With proper selection of the comb characteristics such as the number of teeth, the frequency spacing of teeth, the spectral width of teeth, and the relative amplitude of the teeth, a representation of the Brillouin spectrum at each point in the fiber can be obtained simultaneously with a single pass through the fiber. The use of a comb of frequencies eliminates the need for the slow process of sequentially stepping through a range of frequencies using a distinct pass of light through the fiber at each frequency. The use of a comb of frequencies allows the interrogation process to occur at many different frequencies simultaneously. This innovation significantly reduces the time required to measure the Brillouin spectrum for any length of sensing fiber. In this way, a system for rapidly collecting distributed measurements from fiber optic cable results.

The technique disclosed herein will be able to update the strain information with each two way travel time of the fiber. Thus, a 2 km sensor fiber could be updated at the rate of 50 kHz.

Accordingly, one object of the invention is to provide an improved sensing system for measuring physical characteristics.

A further object of the invention is to provide a fiber optic sensing system that uses the Brillouin scattering process to measure physical characteristics A further object of the invention is to provide a sensor system that can be used to monitor variations in physical characteristic.

A further object of the invention is to provide a sensor system that can be used to monitor vibrations in large structures in a distributed fashion.

A further object of the invention is use the Brillouin scattering process to collect distributed measurements of physical characteristics over a prescribed length of optical fiber.

A further object is to provide a means of rapidly measuring the Brillouin scattering spectrum with a single pass of light through the optical fiber.

A further object is to provide a means of rapidly measuring the Brillouin scattering spectrum through the use of a light beam modified to contain to a comb of frequency components.

A further object is to provide a means to vary the characteristics of the comb to allow each of its frequency components to interact independently through the Brillouin process.

A further object is to use a suitable detection system to monitor the interaction of each frequency component in the comb in order to extract piece-wise measurements of the Brillouin spectrum with a single pass of the comb through the fiber.

BRIEF DESCRIPTION OF THE DRAWINGS

A preferred embodiment of the present invention will be set forth in detail with reference to the drawings, which show the following:

FIG. 2(a) Time domain plot for a frequency difference of 12.92 GHz;

FIG. 2(b) Frequency Spectrum for the point undergoing loss shown in FIG. 2(a);

FIG. 3(a) Single frequency pump without Brillouin interaction;

FIG. 3(b) Pump signal after Brillouin interaction;

FIG. 4 Frequency domain signal broadening after Brillouin interaction;

FIG. 5 Time Domain Comb Signal;

FIG. 11(a) Fiber with two continuous uniformly strained 10 m section;
(b) 10 ns pulse;
(c) Probe signal after interaction;
(d) FFT of signal in (c) showing broadening of the frequency comb due to the interaction;

FIG. 13 Pulse Laser not synchronized with the probe laser resulting in different interaction in each measurement;

FIG. 17 Frequency Spectrum of the EOM output for various values of the bias voltage;

FIG. 22 Down converted after mixing at photodetector;

FIG. 25 3-D view of Brillouin Spectrum for the entire fiber;

FIG. 26 Lorentzian profile with little variation between maximum and minimum;

FIG. 37 Positions taken in static case for reference measurement;

FIG. 40 Approximated positions for dynamic strain measurements; and

DETAILED DESCRIPTION OF THE PREFERRED EMBODIMENT

Figure 1:
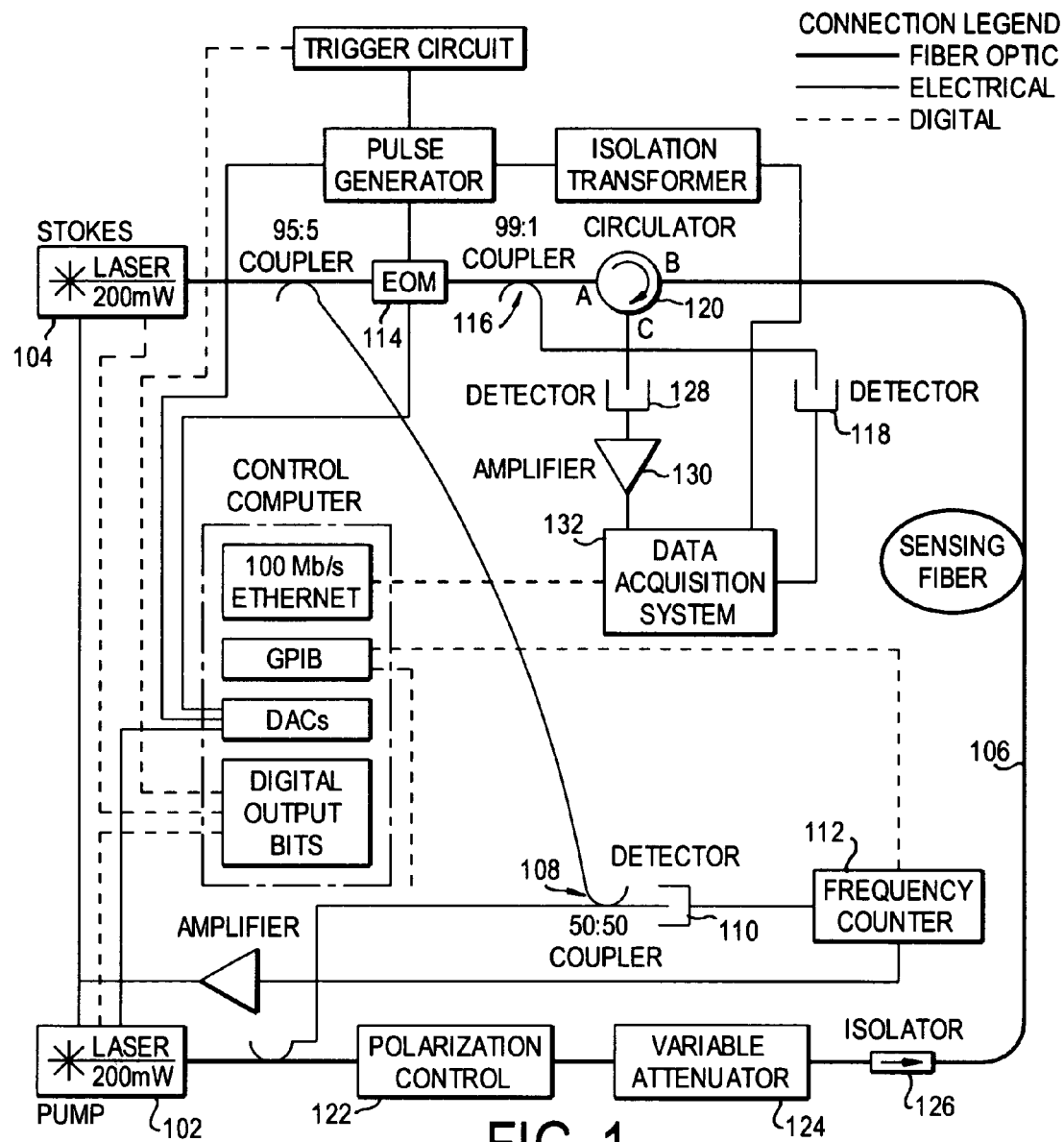
FIG. 1 BOTDA Based system used by the FROST group at UNB (the University of New Brunswick)

A preferred embodiment of the present invention and modifications thereof will be set forth in detail with reference to the drawings, in which like reference numerals refer to like elements or steps throughout.

The sensor system according to the preferred embodiment is based on the principle of Brillouin loss mechanism. The overall system diagram is shown in FIG. 1 as 100. The Nd:YAG lasers 102, 104 operate at 1319 nm. The pulsed light from the pump laser 102 enters one end of the fiber 106, and the cw light from the probe laser 104 enters the other end of the fiber. The frequency difference is varied over a range of values to cover the entire Brillouin spectrum on each point on the fiber. The entire system is automated using software called NTControl which automatically changes the frequency and acquires the data. NTControl is user friendly software having a window in which 35 settings can be adjusted, the most important ones being the fiber start, fiber end, time base, minimum frequency, maximum frequency, frequency step size, and baseline regions.

A part of the output of the two lasers is tapped and mixed using a 50:50 coupler 108 and detector 110 and input to an XL microwave frequency lockbox 112. The lockbox compares the difference signal to an internal reference and generates an error signal that locks the lasers to the internal reference.

The EOM 114 modulates the light to produce pulses. A part of the output of the modulator is tapped out using a 99:1 coupler 116 and input into a DC-1 GHz photodetector 118 to monitor the pulse power, duration and also get a trigger signal for data acquisition. The remaining light enters the sensing fiber 106 under test after passing through a circulator 120. The light from the pump laser enters into the fiber after passing through a polarization controller 122, attenuator 124 and isolator 126. The polarization controller is used to rotate the polarization state to two orthogonal polarizations and the results are averaged to get the signal from all of the fiber. The attenuator helps in controlling the pump power so as to avoid stimulated scattering. The isolator prevents the pulsed light from traveling through the fiber and into the probe laser and thereby causing its destabilization. The Brillouin interacted pump laser goes into the circulator port B and impinges on the detector from circulator port C.

The signal out of the circulator port C is incident on a 1 GHz photodetector 128. The output current is then amplified in an amplifier 130 and displayed as a time domain trace on the oscilloscope screen of a data acquisition system 132. Since the system operates on the principle of Optical Time Domain Analysis and a pulsed laser is being used for the system, interaction at any instant can only occur at a particular location corresponding to the position of the pulse. Since the pulse travels along the fiber, each point on the output signal will correspond to a unique location on the fiber. The width of the pulse governs the spatial resolution of the instrument since all the fiber within the pulse is illuminated simultaneously.

Different points on the fiber will have different Brillouin frequencies due to varying strain and/or temperature. Therefore, as the frequency difference is stepped through various values, different points will undergo varying amounts of gain. For example, if $f_1$ is the frequency difference of the two lasers and this corresponds to the Brillouin frequency of the middle of the fiber, the time domain trace will have a dip in the middle and will be relatively flat for the rest of the time.

The data obtained for each section of the fiber is a series of points corresponding to the frequency step-size. This data is then fitted to the expected Brilloiun profile shape. This is performed using the software SigmaPlot. The algorithm used for the non-linear least squares fitting is based upon the Marquardt-Levenburg algorithm. An initial estimate is specified for the parameters and an iterative approach is applied until the error function has been minimized.

The basic algorithm on which the above system functions is as follows:

1) Initially, the frequency difference between the two lasers is set to a minimum value. The pump and the cw waves are launched from both ends of the fiber and the time domain trace is recorded. The recorded waveforms are the Brillouin power as a function of time.

2) In this way, a number of time domain waveforms are recorded by stepping the frequency difference from a minimum value to a maximum value to cover the entire Brillouin spectrum of the fiber.

3) From this, a three dimensional plot with time-frequency-power on the x-y-z axes is obtained. From this plot, we obtain the Brillouin frequency of each point by plotting the power as a function of frequency (taking slices in the x-z plane).

4) Finally, the strain (or temperature) is calculated from the Brillouin frequency for each point and the strain (or temperature) is plotted as a function of time thereby giving the distribution for each point on the fiber.

A typical measurement using the system described above takes 5-8 minutes to get the entire Brillouin spectrum and is shown in FIGS. 2a and 2b. This disclosure presents the various steps in testing the above system using a novel idea which will help in obtaining the entire Brillouin spectrum for each point on the fiber in one measurement as opposed to using one measurement for each frequency. This in turn decreases the measurement time, thereby allowing making dynamic strain measurements possible and thus observing how the Brillouin spectrum changes in short time duration.

The configuration of BOTDA being used at UNB consists of a cw Stokes signal and a pulsed probe signal at a single frequency each. The power of the cw signal before and after the Brillouin interaction is shown in FIGS. 3(a) and 3(b).

The signal in FIG. 3(b) will vary depending on the interaction in the fiber. In the frequency domain this corresponds to broadening of the delta function, as shown in FIG. 4.

The amount of broadening will depend on the width of the pulsed laser and the length of the strained and/or temperature section. The greater the width of the laser signal, the smaller will be the broadening of the line.

For applications like civil structural monitoring and aerospace vehicle sensing, although BOTDA systems provide centimeter resolutions and kilometers ranges, they lack the capability to measure dynamic strain. Fundamentally, the information is there in the signal, we just need to devise a methodology to extract it fast enough. Consider modulating the pump signal in order to extract this information.

The new signal should be such that it contains multiple frequencies at the same time at one point on the fiber so that the entire Brillouin spectrum can be obtained in two to three measurements.

The power of the new pump signal is controlled using an attenuator to prevent saturation of the detector and stimulated scattering.

Two signal configurations were found to be suitable for this approach: the comb signal and the signal obtained by summation of sinusoids with random phase.

The comb signal (S1) is a special kind of signal which consists of discrete delta functions both in the time as well as frequency domain (comb teeth). Since ideal delta functions cannot be generated using arbitrary waveform generator, we used the following approximate expression of a pulse train to generate the comb signal:

$$x(t) = V \begin{bmatrix} k + \frac{2}{\pi}\sin(k\pi)\cos(\omega_o t) + \frac{1}{2}\sin(2k\pi)\cos(2\omega_o t) + \ldots + \\ \frac{1}{n}\sin(nk\pi)\cos(n\omega_o t) + \ldots \end{bmatrix} \quad (2.1)$$

where t is the width of the individual pulses, $$k = \frac{t}{T_o},$$

$T_o$ is the spacing between adjacent pulses

Figure 6:
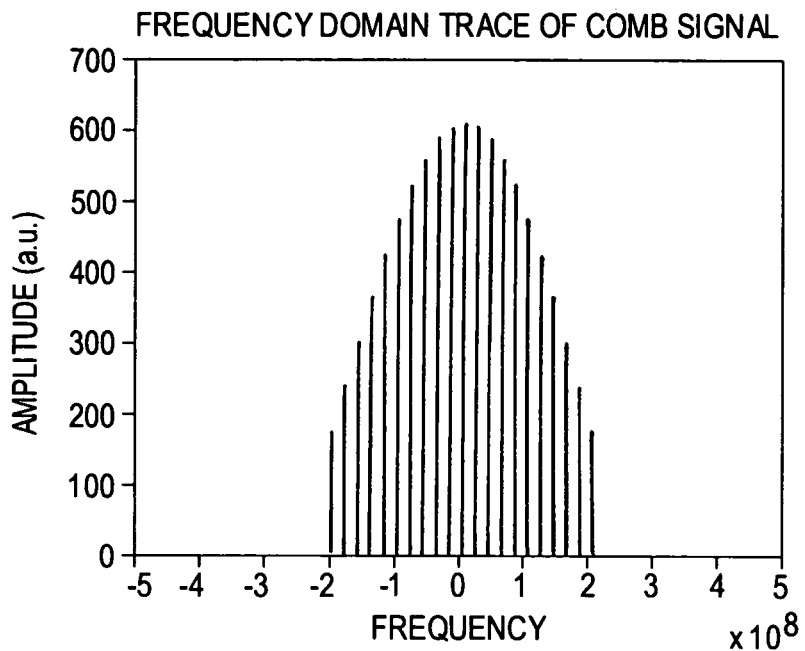
FIG. 6 Frequency Domain Comb Signal.

The above expression represents a train of rectangular pulses in time domain. By setting the width of the pulses to be very small, we can approximate a train of delta functions. The signal is shown in the time domain in FIG. 5 and in the frequency domain in FIG. 6.

The second signal (S2) is obtained by direct addition of sinusoids with random phase:

$$x(t) = \begin{bmatrix} \sin(\omega_m t + R(1)) + \sin(2\omega_m t + 2R(2)) + \\ \sin(3\omega_m t + 3R(3)) + \ldots + \sin(n\omega_m t + nR(n)) \end{bmatrix} \quad (2.2)$$

where $\omega_m$ is the lowest frequency at which the comb signal appears

Figure 7:
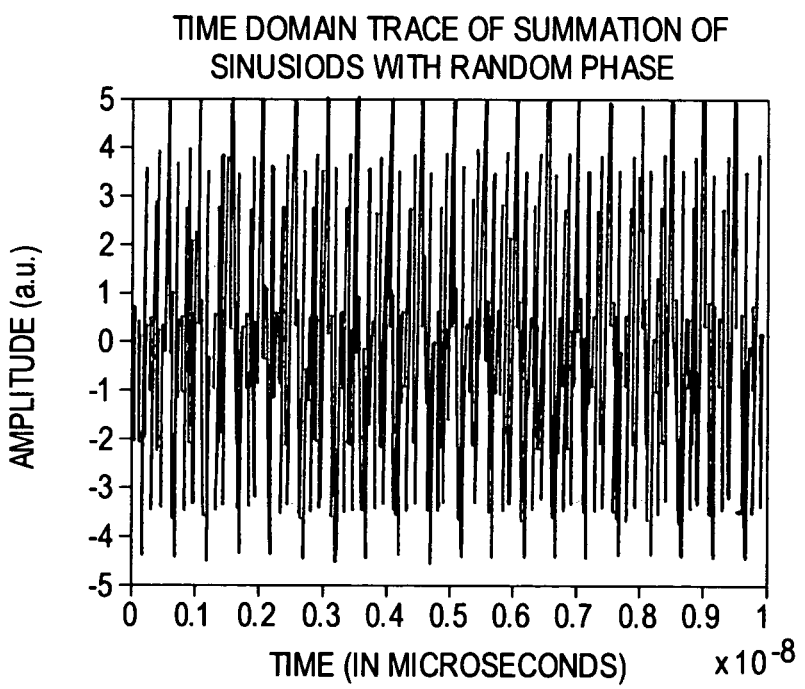
FIG. 7 Time domain trace of sum of sinusoids with random phase.
Figure 8:
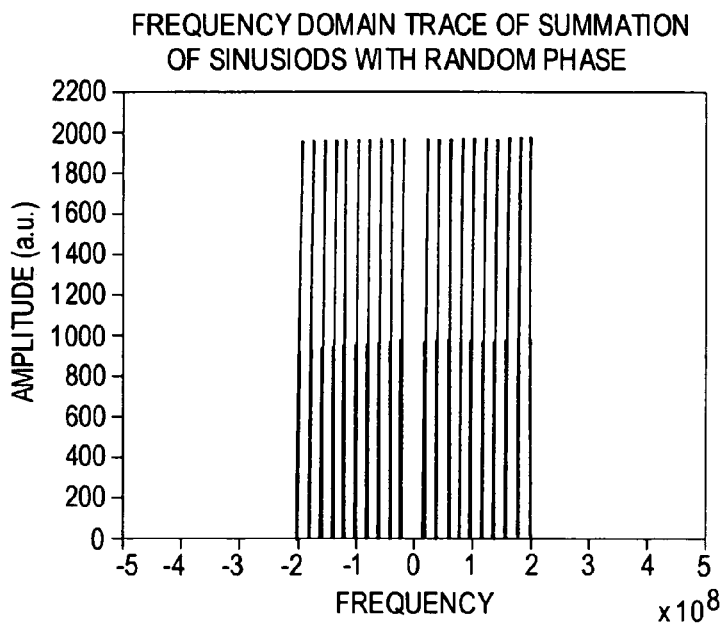
FIG. 8 Frequency Domain trace of sum of sinusoids with random phase.

R (1), R (2), R (3) . . . are the elements of an array representing random phase This signal consists of delta functions (comb teeth) in the frequency domain, but in the time domain it does not go to zero at points between the periods of the pulse. This signal is shown in the time domain in FIG. 7 and in the frequency domain in FIG. 8.

For the purpose of this disclosure, the second signal was found to be suitable for the following reasons.

First, the energy of the components at higher frequencies tends to fall-off for the comb signal, whereas the second signal has equal energy in all its frequency content. From the point of view of Brillouin interaction, the pump signal should have as much power as possible for maximum interaction but it should be below the Brillouin threshold to prevent stimulated scattering. Thus it would be preferable to have all teeth at maximum power below threshold to have good SNR.

Second if there is variation in the various frequency components due to some interaction other than the Brillouin interaction, then it will be much easier to scale the various frequency components by pre-multiplying in the arbitrary waveform generator in the case of the second signal. This is because the energy in the various components was equal to start with in this case.

Third, in the time domain, the ideal comb signal goes to zero between pulses. In effect, this would make both the pump and probe to be pulses. Hence, there will be regions where there is no pump light and hence, no interaction. For the random phase sinusoid, there will be an optimum combination of phases for which the amplitude is maximized and this can be used for the interaction.

The analysis to follow assumes that the signal obtained by summation of sinusoids with random phase has been selected.

Figure 9:
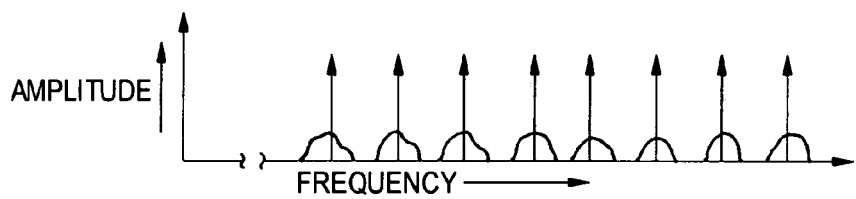
FIG. 9 Broadening of Comb teeth after Brillouin interaction.

To obtain the Brillouin spectrum accurately, the comb teeth spacing in the frequency domain should be as small as possible. But each of the teeth will undergo broadening after the interaction on the fiber, as shown in FIG. 9. This places a lower limit on the spacing between the teeth.

Spatial resolution is determined by the pulse width. Greater spatial resolution implies a smaller period pump signal and consequently, more bandwidth and greater distance between the comb teeth in frequency. More spacing between the comb teeth implies that the Brillouin spectra cannot be obtained completely in one measurement because the spectrum itself is about 30 MHz wide and hence information is lost. Thus, there are two contradictory situations.

Figure 10:
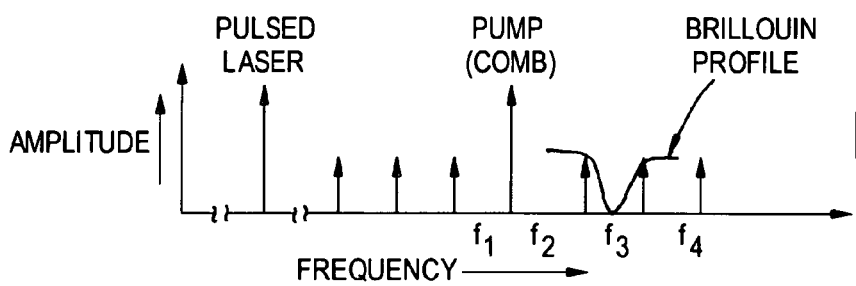
FIG. 10 Wide comb teeth spacing resulting in insufficient information on the comb teeth to get entire Brillouin spectrum.

In FIG. 10, $f_1$ is frequency of the pump laser ≈192 THz in our case.

$f_2=f_1+25$ MHz; $f_3=f_1+50$ MHz; $f_4=f_1+75$ MHz

The Brillouin frequency might fall at $f_1+37$ MHz and hence the measurement might not yield accurate results.

As mentioned earlier, each of the comb teeth will undergo broadening due to the Brillouin interaction and the amount of broadening will depend on the laser pulse signal width. This will be explained with reference to FIGS. 11(a)-(d). FIG. 11(a) shows a length of fiber 1100 including a strained portion 1102 between points 1101 and 1103 and another portion 1104 between points 1103 and 1105.

Assuming that the Brillouin coefficient remains constant over the length of fiber of uniform strain, the Brillouin signal can be thought of as a convolution of the shape of the uniformly strained section (approximately rectangular) and the pulse shape (rectangular), the latter of which is shown in FIG. 11(b). The convolution will thus result in a triangular shape. As the pulse enters the fiber 1100 at point 1101, the probe signal starts decreasing and reaches a minimum at point 1103 when the pulse signal is fully within the strained section 1102. When the leading edge of the pulse leaves the strained section at point 1103, the signal starts to increase again and increases till the lagging edge leaves point B. The resulting pulse is shown in FIG. 11(c). The broadening of the comb in the frequency domain is shown in FIG. 11(d).

Figure 12A:
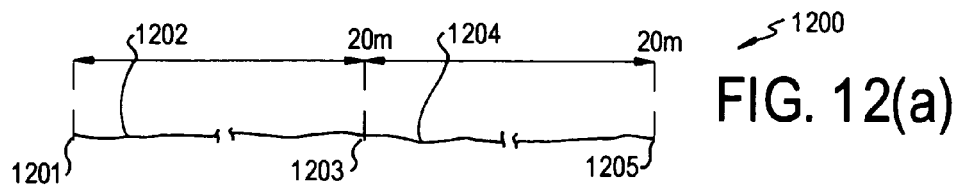
FIG. 12(a) Fiber with two continuous uniformly strained 20 m section;
(b) 100 ns pulse;
(c) Probe signal after interaction;
(d) FFT of signal in (c) showing broadening of the frequency comb due to the interaction.
Figure 12B:
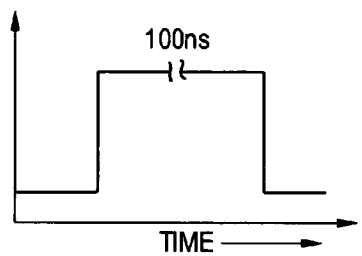
Figure 12C:
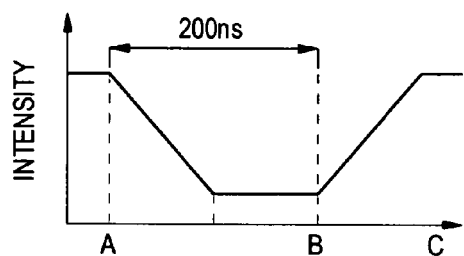
Figure 12D:
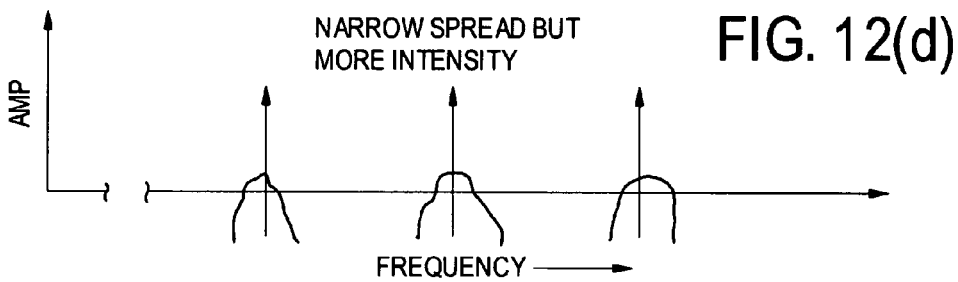

A similar situation, except with different numerical values, will be explained with reference to FIGS. 12(a)-(d). In FIG. 12(a), a fiber 1200 includes a 20 m uniformly strained section 1202 between points 1201 and 1203 and another section 1204 between points 1203 and 1205. FIGS. 12(b)-(d) correspond to FIGS. 11(b)-(d), except that they relate to the fiber 1200 of FIG. 12.

Now when there is a 20 m uniformly strained section and a pulse width of 100 ns is used, the signal once again decreases as the leading edge of the pulse enters the fiber but the slope at which it decreases is smaller than the previous case. The minimum and a maximum are reached in the same way as the previous case. Hence, in the frequency domain this signal will contain a smaller spread around each tooth because of the smaller rate of change (slope) of the cw signal due to the interaction. Also the intensity of the spread due to the interaction will be stronger due to the fact that the 100 ns pulse has more power than the 10 ns pulse. But now the spatial resolution is lesser than before.

Hence the pulse width governs the bandwidth. Moreover, as seen from the above Figures, to obtain more than one point on the strained section in the measurement, the pulsewidth should be less than the length of the strained section.

Since both the pump and the Stokes signal in the new configuration are periodic, the timing at which the pulse is sent down the fiber becomes very important. The pump signal is continuously running on the fiber and a single pulsed probe signal is sent down the fiber at a certain repetition rate. If the pulses are being generated at their own frequency without synchronization with the pump signal, then for each new measurement, the interaction starts at a different location on the comb signal, as shown in FIG. 13.

In FIGS. 11(c) and 12(c), pulse A corresponds to the first measurement. Pulse B corresponds to the second measurement and C to the third one. In order to get interaction at the same relative positions of both signals each time, the pulse has to be triggered by the comb signal.

After deciding the new modulating signal format, the mathematical expressions for the signals after Brillouin interaction on the line are obtained. This approach is useful because it gives an intuitive idea of the Brillouin interaction with the new signal configuration before performing the actual experiments. Two modulation schemes were found to be suitable for generating the new pump signal: Amplitude Modulation (AM) and Phase Modulation (PM).

Figure 14:
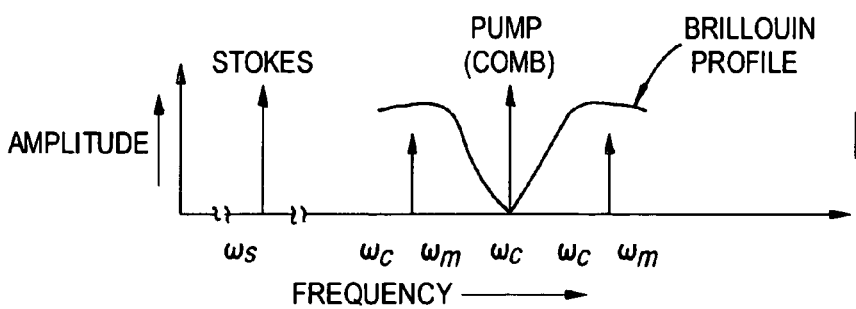
FIG. 14 Frequency spectrum for the case of two lasers having a frequency difference corresponding to the Brillouin frequency.

For the initial analysis, with reference to FIG. 14, we are considering the case of only two sidebands on the carrier signal and later it will be generalized for the case of multiple frequencies.

The AM wave is given by:

$$e_s(t) = E_s[1 + m\cos\omega_m t]\cos\omega_c t \quad (2.3)$$

$$= E_s\left[\cos\omega_c t + \frac{m}{2}\cos(\omega_m + \omega_c)t + \frac{m}{2}\cos(\omega_m - \omega_c)t\right]$$

where $\omega_m$ is the modulating signal frequency, $\omega_c$ is the carrier signal (pump laser) frequency, $\omega_s$ is the Stokes laser frequency, $\omega_c - \omega_s$ = the Brillouin frequency of the fiber.

To do a mathematical analysis of the Brillouin interaction, the Brillouin signal acting on the pump is denoted by b(t). This is a time varying signal whose form changes depending on where we are on the 30 MHz wide Brillouin spectrum. However, this signal acts only on the carrier signal because that signal is located at the Brillouin frequency of the fiber. For this analysis, we assume that the sidebands are outside the spectrum and hence undergo no interaction. Basically, the AM carrier signal above undergoes a secondary AM on interaction with the Brillouin signal b(t):

$$e_s(t) = E_s\left[b(t)\cos\omega_c t + \frac{m}{2}\cos(\omega_m + \omega_c)t + \frac{m}{2}\cos(\omega_m - \omega_c)t\right] \quad (2.4)$$

$$= E_s[b(t) + m\cos(\omega_m t)]\cos(\omega_c t)$$

$$= \text{Re}\{E_s[b(t) + m\cos(\omega_m t)]e^{j\omega_c t}\}$$

At the detector, heterodyne detection is performed by coupling the signal with a local oscillator (probe laser signal) and then impinging on a detector. The signal at the output of coupler is:

$$e_s(t) = \text{Re}[E_s\{b(t) + m\cos(\omega_m t)\}e^{j\omega_c t} + E_L e^{j(\omega_c - \omega_d)t}] \quad (2.5)$$

$$= \text{Re}[V(t)]$$

where $\omega_d$ is the frequency difference between the pump and the local oscillator (probe), which in this case is the Brillouin frequency.

The current detected at the photodetector is:

$$i_c(t) \alpha V(t)V*(t) = [E_s\{b(t) + m\cos(\omega_m t)\}e^{j\omega_c t} + E_L e^{j(\omega_c - \omega_d)t}] \times$$

$$[E_s\{b(t) + m\cos(\omega_m t)\}e^{-j\omega_c t} + E_L e^{-j(\omega_c - \omega_d)t}]$$

$$= E_L^2 + \frac{m^2 E_S^2}{2} + E_S^2 b^2(t) + 2mE_S^2 b(t)\cos(\omega_m t) +$$

$$2E_S E_L b(t)\cos(\omega_d t) + mE_S E_L \cos(\omega_c + \omega_m)t +$$

$$mE_S E_L \cos(\omega_c - \omega_m)t$$

Taking the Fourier Transform of the above expression gives the following:

$$i_c(\omega) = \quad (2.6)$$

$$E_L^2 + \frac{m^2 E_S^2}{2} + E_S^2(B(\omega) * B(\omega)) + 2mE_S^2\{B(\omega - \omega_m) + B(\omega + \omega_m)\} +$$

$$2E_S E_L\{B(w - w_d) + B(w + w_d)\} +$$

$$mE_S E_L\{\delta(\omega - (\omega_m + \omega_c)) + \delta(\omega + (\omega_m + \omega_c))\} +$$

$$mE_S E_L \left\{ \begin{array}{l} \delta(\omega - (\omega_c - \omega_m)) + \\ \delta(\omega + (\omega_c - \omega_m)) \end{array} \right\}$$

From equation 2.6, it is clear that the term in bold is the Brillouin signal at the difference frequency of the two lasers. This signal will be spread in a small band around $\omega_d$. The spread will be governed by various factors like the pulsewidth, and the width of the strained section. This analysis confirms the intuitive understanding that each of the teeth will undergo broadening governed by their location with respect to the Brillouin spectrum.

A similar analysis can be carried out for the case of the carrier and one of the sidebands falling within the Brillouin gain spectrum. In this case, the carrier and the sideband will interact with two different Brillouin signals instead of one as in the above case.

The above two analyses can also be generalized for the case of more than one modulating signal for an AM wave of the form below but will not be presented here. In this case each of the sideband within the Brillouin spectrum will be multiplied by a different Brillouin signal.

$$s(t) = A_c \Big[\cos\omega_c t + \frac{m}{2}\cos(\omega_{m1}+\omega_c)t + \frac{m}{2}\cos(\omega_{m1}-\omega_c)t + \frac{m}{2}\cos(\omega_{m2}+\omega_c)t +$$
$$\frac{m}{2}\cos(\omega_{m2}-\omega_c)t + \frac{m}{2}\cos(\omega_{m3}+\omega_c)t + \frac{m}{2}\cos(\omega_{m3}-\omega_c)t + \ldots \Big]$$

Next the case of phase modulation of the pump signal is considered. The mathematical formula for only two teeth in the comb is derived and the validity of the approach is confirmed. PM is a good choice for modulation scheme because in this case, the lasers will always be in the on state.

The general expression for a PM signal is:

$$s(t) = A_c \cos[\omega_c t + \beta \cos\omega_m t] \quad (2.7)$$

where $\omega_c$ is the carrier frequency (pump laser)$\approx$192 THz; $\omega_m$ is the modulating signal frequency; $\beta$ is the modulation index $$s(t) = \text{Re}[A_c \exp(j\omega_c t + j\beta\sin\omega_m t)]$$
$$= \text{Re}\Big[A_c \sum_{-\infty}^{\infty} J_n(\beta) e^{j(\omega_c + n\omega_m)t}\Big]$$

Now only the signal at frequency $\omega_c$ undergoes Brillouin interaction. So as in the previous case, the Brillouin signal is represented by b(t) and it multiplies with the carrier signal only.

$$s(t) = \text{Re}\Big[A_c J_o(\beta) b(t) e^{j\omega_c t} + A_c \sum_{n=-\infty, n\neq 0}^{\infty} J_n(\beta) e^{j(\omega_c + n\omega_m)t}\Big]$$

At the detector, after coupling with the local oscillator, the signal becomes $$s(t) = \text{Re}\Big[A_c J_o(\beta) b(t) e^{j\omega_c t} + A_c \sum_{n=-\infty, n\neq 0}^{\infty} J_n(\beta) e^{j(\omega_c + n\omega_m)t} + E_L e^{j(\omega_c - \omega_d)t}\Big]$$
$$= \text{Re}[V(t)]$$

(2.8)

The current at the output of the photodetector after simplification is:

$$s(t) = V(t) \times V^*(t)$$
$$= A_c J_o^2(\beta) b^2(t) + 2 A_c J_o(\beta) E_L b(t)\cos\omega_d t +$$
$$2 A_c^2 J_o(\beta) b(t) \sum_{\forall n, n\neq 0} J_n(\beta)\cos(n\omega_m t) +$$
$$2 E_L A_c \sum_{\forall n, n\neq 0} J_n(\beta)\cos(\omega_d + n\omega_m)t + A_c^2 \sum_{n=m, n\neq 0} J_n(\beta) J_m^*(\beta) +$$
$$A_c^2 \sum_{n=m, n\neq 0} J_n(\beta) J_m^*(\beta)\cos(n-m)\omega_m t +$$

-continued $$j A_c^2 \sum_{n=m, n\neq 0} J_n(\beta) J_m^*(\beta)\sin(n-m)\omega_m t + E_L^2$$

Taking the Fourier Transform of the above expression yields $$i_c(\omega) = A_c^2 J_o^2(\beta)\{B(\omega) \otimes B(\omega)\} + A_c J_o(\beta) E_L\{B(\omega - \omega_d) + B(\omega + \omega_d)\} +$$
$$A_c^2 J_o(\beta) \times \sum_{\forall n, n\neq 0} J_n(\beta)\{B(\omega - n\omega_m) + B(\omega + n\omega_m)\} +$$
$$A_c E_L \sum_{\forall n, n\neq 0} J_n(\beta)\{B(\omega - (\omega_d + n\omega_m)) + B(\omega + (\omega_d + n\omega_m))\} +$$
$$A_c^2 \sum_{n=m, n\neq 0} J_n(\beta) J_m^*(\beta) + \sum_{n\neq m, n\neq 0} \frac{J_n(\beta) J_m^*(\beta)}{2} \times \left[\begin{array}{c}\delta(\omega - (n-m)\omega_m + \\ \delta(\omega - (n-m)\omega_m\end{array}\right] +$$
$$\sum_{n\neq m, n\neq 0} \frac{J_n(\beta) J_m^*(\beta)}{2}\left[\begin{array}{c}\delta(\omega - (n-m)\omega_m) - \\ \delta(\omega + (n-m)\omega_m)\end{array}\right] + E_L^2$$

On simplification of the above expression, $$i_c(\omega) = A_c^2 \sum_{n=m, n\neq 0} J_n(\beta) J_m^*(\beta) + \quad (2.9)$$
$$A_c^2 J_o^2(\beta)\{B(\omega) \otimes B(\omega)\} + A_c J_o(\beta) E_L\left\{\begin{array}{c}B(\omega - \omega_d) + \\ B(\omega + \omega_d)\end{array}\right\} +$$
$$A_c^2 J_o(\beta) \sum_{\forall n\neq 0} J_n(\beta)\{B(\omega - n\omega_m) + B(\omega + n\omega_m)\} +$$
$$A_c E_L \sum_{\forall n\neq 0} J_n(\beta) \times \left\{\begin{array}{c}B(\omega - (\omega_d + n\omega_m)) + \\ B(\omega + (\omega_d + n\omega_m))\end{array}\right\} +$$

-continued $$\sum_{n\neq m\neq 0} J_n(\beta) J_m^*(\beta)\{\delta\omega - (n-m)\omega_m\} + E_L^2$$

If $\beta \ll 1$, then $J_o(\beta) \approx 1$, $J_1(\beta) = \frac{\beta}{2}$, $J_n(\beta) = 0 \forall n \neq 0, 1$ Equation 2.9 simplifies to $$i_c(\omega) = \frac{A_c^2 \beta^2}{4} + A_c^2\{B(\omega) * B(\omega)\} + A_c E_L\{B(\omega - \omega_d) + B(\omega + \omega_d)\} + \quad (2.10)$$
$$A_c^2 \frac{\beta}{2}\{B(\omega - \omega_m) + B(\omega - \omega_m)\} +$$

-continued $$A_c E_L \frac{\beta}{2} \left\{ \begin{array}{l} B(\omega - (\omega_d + \omega_m)) + \\ B(\omega + (\omega_d + \omega_m)) \end{array} \right\} + E_L^2$$

The content of the above expression is analyzed term by term. It consists of the following terms:

D.C. Component and Brillouin Signal at baseband

A large component at the difference frequency $\omega_d$ of the L.O. and the pump (desired signal)

Component at frequency $\omega_m (\forall_n \neq 0)$. This component has very small amplitude scaled by $\beta$.

Other terms are small in amplitude and negligible

If the phase modulation index $\beta$ is kept small, then the PM approximates AM with only one upper and lower sideband. This is known as narrow band phase modulation. We can extend the narrow-band PM case to have multiple comb frequencies with almost equal amplitude if $\beta$ is kept very small. The mathematical expression for this case is:

$$s(t) = A_c \cos\{\omega_c t + \beta \cos\omega_{m1} t + \beta \cos\omega_{m2} t + \beta \cos\omega_{m3} t + \ldots + \beta \cos\omega_{mn} t\} \quad (2.11)$$

This signal can be analyzed in the same way as the PM case above, to obtain expressions for Brillouin interacted signal. When simulated, the narrowband PM case was found to have a relatively flat spectrum. The signal obtained is shown below.

Figure 15:
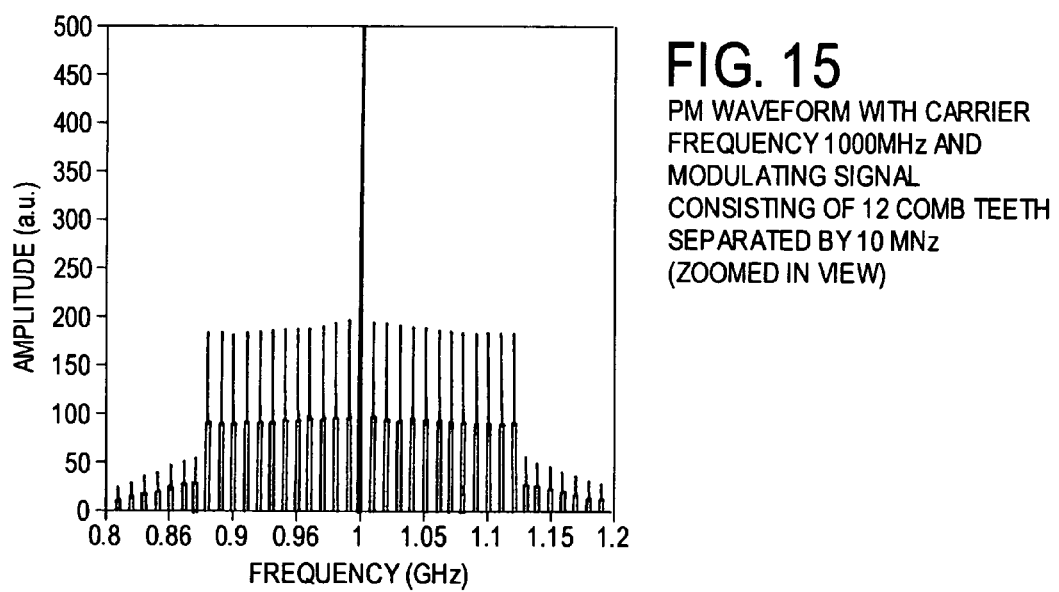
FIG. 15 Frequency spectrum of narrowband PM waveform.

As seen from FIG. 15, the comb teeth obtained were relatively flat. However, one problem with the PM signal is that the carrier signal is very large as compared to the sidebands. In the simulations, the carrier was almost 20 times larger. This is not seen in the Figure because it is a zoomed in view. This means that the high power of the carrier will result in causing stimulated Brillouin scattering in the fiber which is undesirable. But in the case of AM, the carrier signal is not very large as compared to the sidebands and its amplitude can also be controlled by changing the dc bias of the modulator. So, the AM case was chosen for the new system.

The theoretical basis for the new system was developed. Two different signals were found to be suitable for this: the ideal comb and the signal obtained by random phase summation of sinusoids. The second signal was selected and analyzed with respect to the Brillouin sensing requirements. Finally, expressions were obtained for both AM and PM modulated, Brillouin interacted signals and the Amplitude Modulation scheme was found to be suitable.

Before proceeding with the actual experiments, a detailed model for the Brillouin interaction was developed in MATLAB. The signals formulated above are used to simulate this model. The results obtained here would give an idea of what to expect in the experimental results.

Two modulators will be used in the new system configuration: one on the pump laser end and the other on the probe laser end. In order to understand the functioning of the system, simulations were performed to determine the functioning of the electro-optical modulator. The output signal of the modulator is given by:

$$s_o(t) = \cos\left(\frac{\Delta\Phi}{2}\right) E_i e^{-j\Phi_o} e^{-j\omega_c t}$$

where $$\Phi_o = \frac{\Phi_1 + \Phi_2}{2}$$

is the average phase delay, and $\Delta\Phi$ is the phase delay between the two arms of the modulator.

The transfer function is given by $$\frac{I_o}{I_i} = \cos^2\left(\frac{\Delta\Phi}{2}\right) \quad (4.1)$$

Figure 16:
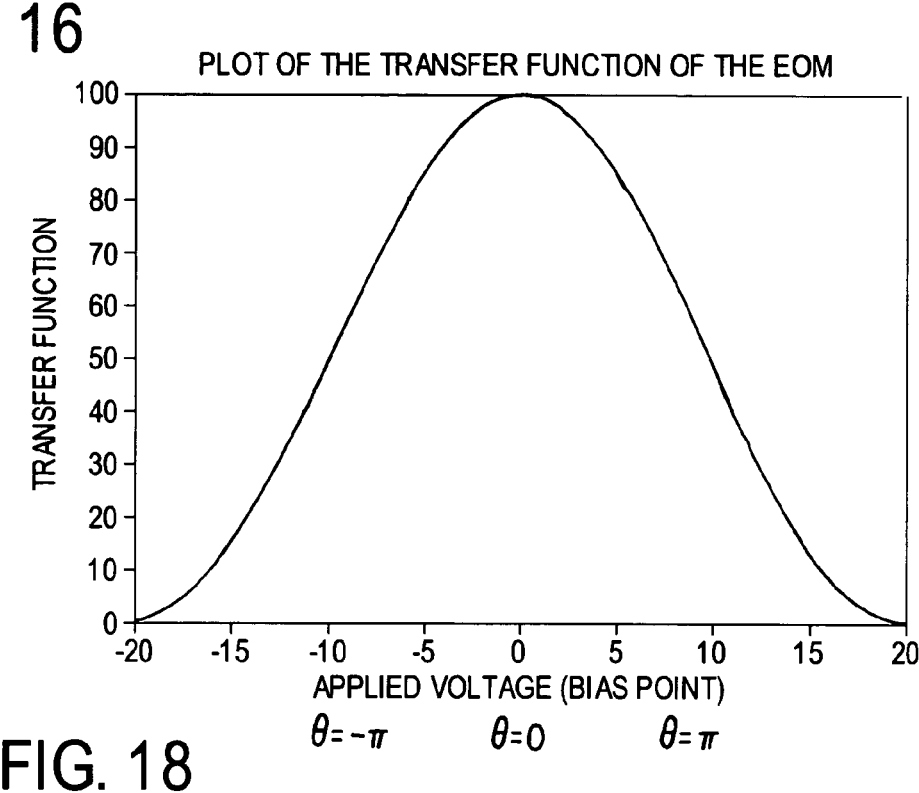
FIG. 16 Transfer Function of EOM.

In the above figure, the value of the half wave voltage $V_\pi = 20$ V. The transfer function is shown in FIG. 16.

The applied signal was a summation of 12 sinusoids having random phase with frequency spacing of 10 MHz. The carrier frequency for amplitude modulation was 1.1 GHz. The value of the bias point was changed so that the carrier amplitude is as close to the comb teeth amplitude as possible. The frequency spectrum of the output waveform was plotted. The plots are shown in FIG. 17.

From the plots of FIG. 17, it is observed that the optimum value of the bias point for which the carrier amplitude comes close to the side bands lies somewhere between $$\theta = \gamma\pi = \frac{3\pi}{4} \text{ and } \theta = \pi \text{ (extinction)}$$

i.e. the value of the dc bias voltage for low carrier amplitude lies between 15 V and 20 V. For the simulations, a value of 17.5159 ($\theta = 2.75$) was chosen.

As seen in FIG. 17, the values of the individual comb teeth are not equal. This is because when the signal goes through the modulator, there are a number of other frequency components which contribute to the signal.

Figure 18:
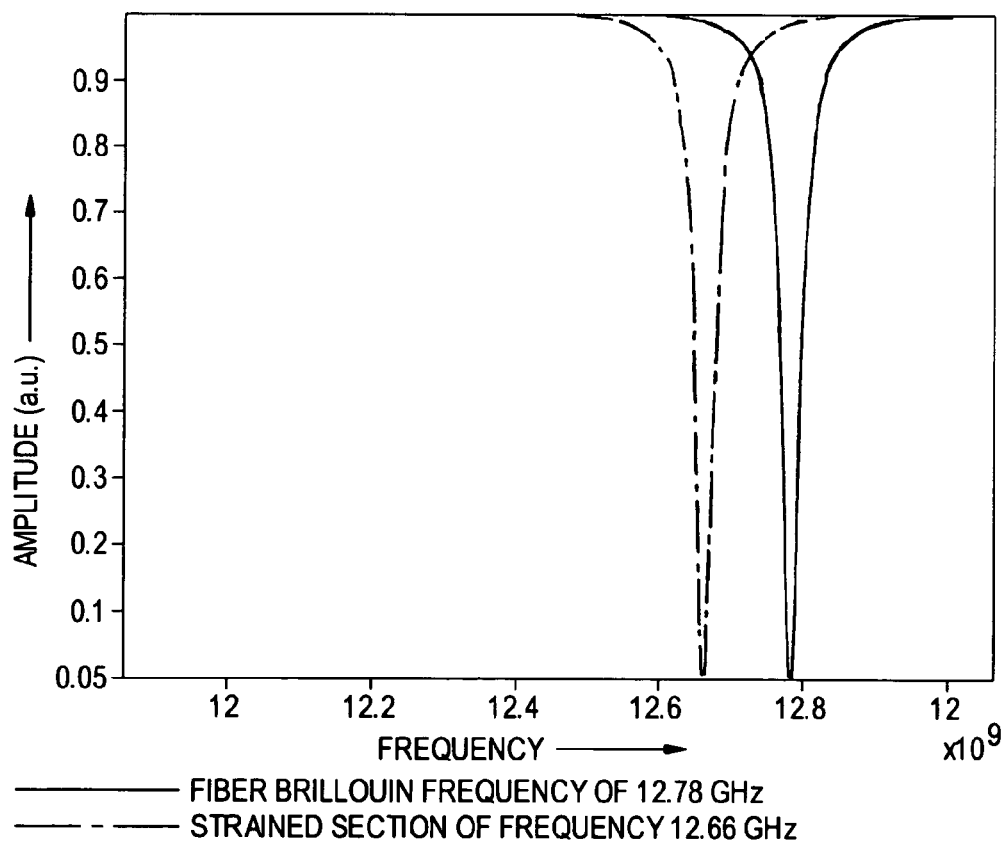
FIG. 18 Lorentzian Brillouin profile.

The Brillouin power as a function of frequency was plotted using the formula:

$$P(v) = P_c e^{-\alpha L}\left[1 - \exp(-g_B(v))P_p \frac{L_{eff}}{A_{eff}}\right] \quad (4.2)$$

where $P_P$ and $P_c$ are the powers of the probe and the pump lasers, $A_{eff}$ is the effective core area, $$L_{eff} = \frac{1}{\alpha}(1 - e^{-\alpha L})$$

is the effective fiber length, L=actual fiber length, $\alpha$=attenuation in Np/m, $g_B(v)$ is the Brillouin gain spectrum given by the Lorentzian profile shown in FIG. 18. Illustrative examples of the parameters are given in Table I below:

TABLE I

| Parameter | Value |
| --- | --- |
| $P_P$ | 30.9 mW |
| $P_c$ | 1.8 mW |
| $A_{eff}$ | $80 \times 10^{-12}$ m² |
| $L_{eff}$ | 30 |

TABLE I-continued

| Parameter | Value |
| --- | --- |
| α | 0.040295 Np/m |
| $\Delta v_B$ | 30 MHz |

The above function is a gain function. In our case, the pump laser is undergoing loss on the fiber, so the above profile was inverted and normalized to 1. Two profiles were created at different frequencies: one corresponding to the Brillouin frequency of the unstrained fiber $\omega_{B1}$ and the other corresponding to that of the strained section $\omega_{B2}$.

Figure 19:
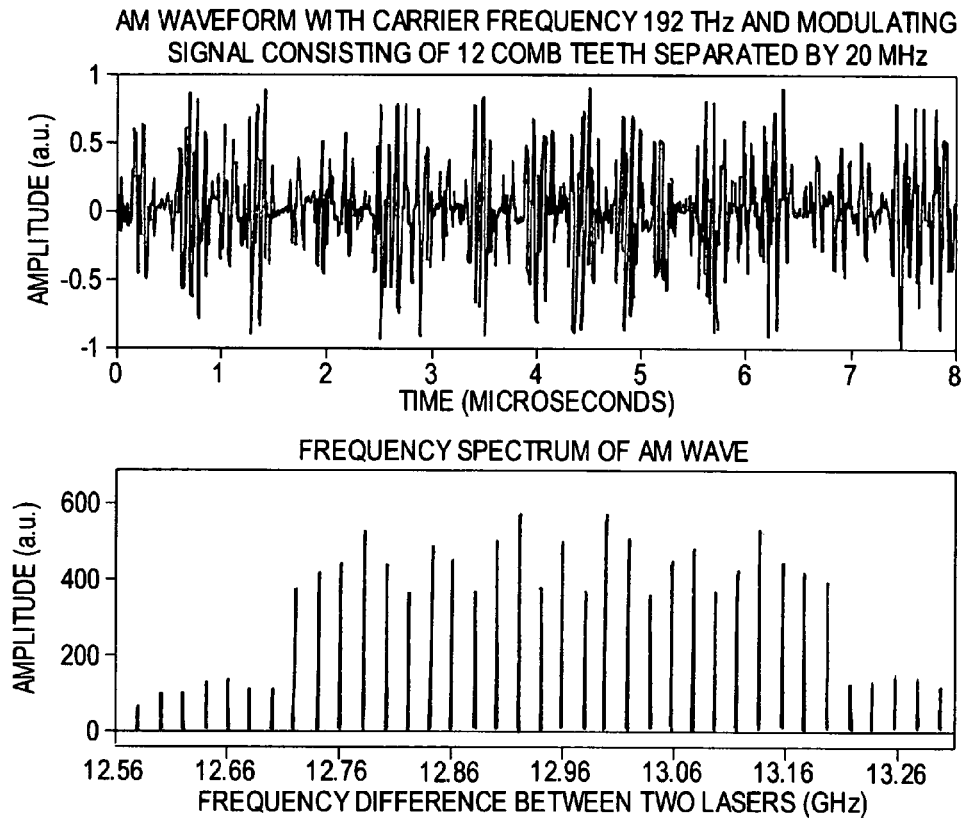
FIG. 19 A.M. wave.

The amplitude modulated waveform has a carrier frequency of 192 THz and there are 12 sidebands located at a frequency spacing of 20 MHz. This AM waveform is 8000 points long. This wave was created by passing it through the EOM with a transfer function given in equation 4.1 and is shown in FIG. 19.

Figure 20:
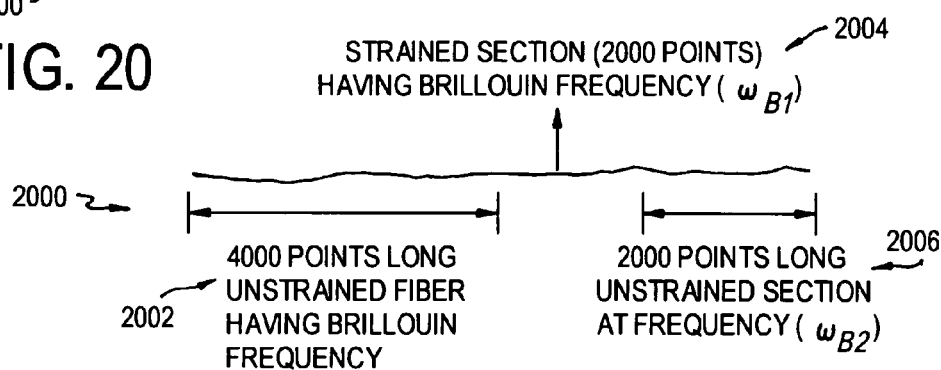
FIG. 20 Illustration of the fiber simulated in Matlab.

A simulation of a fiber to be used in the calculations to be described immediately below will be described with reference to FIG. 20. A fiber 2000 has a unstrained section 2002 which is 4000 points long, a strained section 2004 which is 2000 points long, and an unstrained section 2006 which is 2000 points long.

Figure 21:
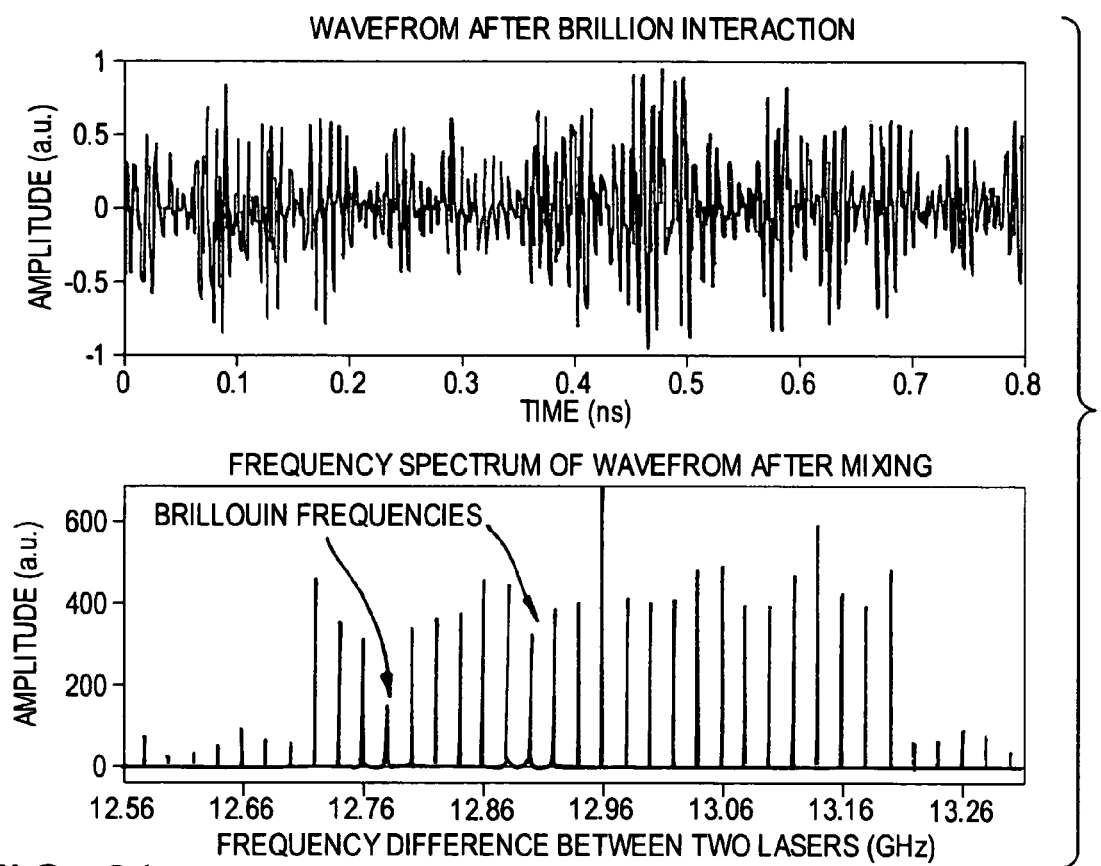
FIG. 21 Brillouin interacted wave.

In order to simulate a fiber with multiple strained sections, the fft of the first 4000 points was multiplied with the first Brillouin profile (dotted line in FIG. 18) created above having a Brillouin frequency of $\omega_{B1}$ (12.78 GHz). The fft of the next 2000 points was multiplied by the second Brillouin profile (solid line) having a Brillouin frequency of $\omega_{B2}$ (12.90 GHz) corresponding to a strained section. Finally, the frequency spectrum of the remaining 2000 points was again multiplied by the first profile. The waveforms are shown in FIGS. 21 and 22.

In the above figure, the frequency domain plot shows a big dip at 12.78 GHz and a smaller dip at 12.90 GHz as shown by the arrows at those frequencies. For the detection process, heterodyne detection was simulated because when the new system was simulated using direct detection, the lower and upper sidebands overlap and the information is lost. In this, the Brillouin signal is combined with a local oscillator laser using a coupler and then detected at the photodetector. This produces a current at the difference frequency of the two input signals. A local oscillator with a frequency of 192 THz+13.66 GHz, so at the output we got a signal centered at 700 MHz.

Figure 23:
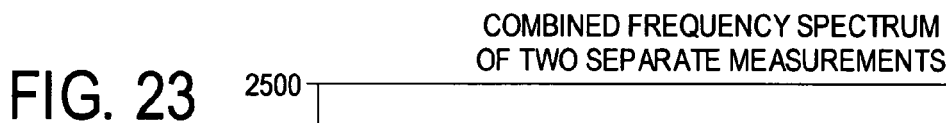
FIG. 23 Proposed Signal Configuration.

As discussed earlier, the frequency spacing between the individual comb teeth should be small, but this spacing cannot be made very small because the teeth will undergo broadening on Brillouin interaction. But more spatial resolution requires more spacing between the teeth. To satisfy these two contradictory requirements, as well as obtain the entire spectrum fast without loss of spatial resolution, the frequency spacing can be kept large (hence more spatial resolution), say 20 MHz and one measurement taken. Then, all the comb teeth can be shifted by a small amount, say 10 MHz, while maintaining the same relative frequency difference and another measurement taken and the information from the two combined. An example is shown in FIG. 23.

The solid lines correspond to one measurement. The dotted lines correspond to the next set of measurement after shifting all the comb teeth by a small frequency. In this way there will be many comb frequencies over the 30 MHz spectrum of the Brillouin profile.

Figure 24:
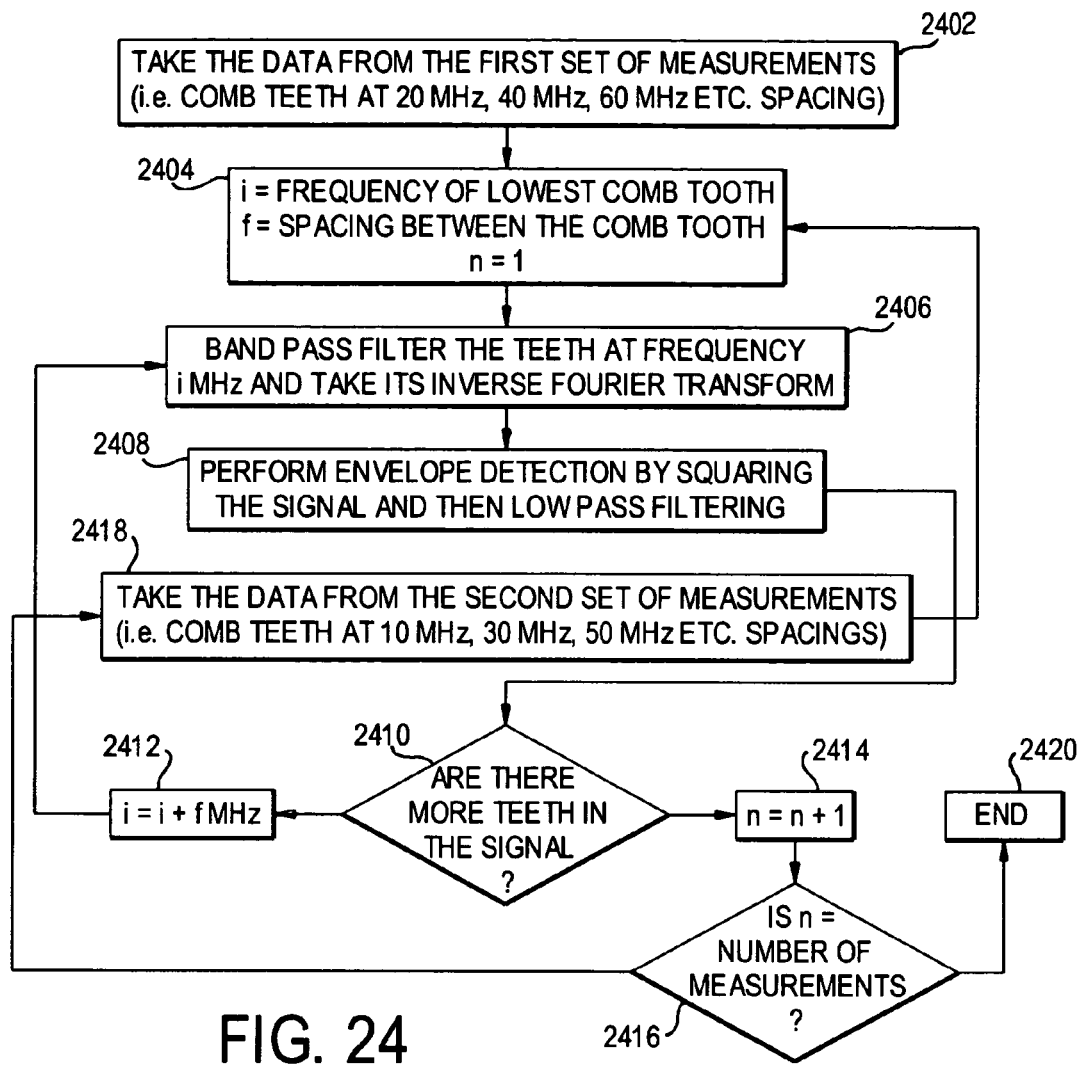
FIG. 24 Algorithm used for post processing.

The algorithm used in the detection process is shown in FIG. 24. In step 2402, the data are taken from the first set of measurement. In step 2404, values are set for the frequency of the lowest comb tooth, the spacing between comb teeth and a counter value n. In step 2406, the teeth are band pass filtered at a frequency i and are inverse Fourier transformed. In step 2408, the envelope detection is performed by squaring the signal and then low pass filtering. If it is determined in step 2410 that there are more teeth in the signal, then the value of i is incremented by f in step 2412, and the process loops to step 2406 with the incremented value of i. If there are no more teeth in the signal, then in step 2414, n is incremented by one. If it is determined in step 2416 that n has not yet reached a value equal to the number of measurements, then in step 2418, the data from the second set of measurement are taken, and the process loops back to step 2404. Otherwise, the process ends in step 2420.

Figure 25:
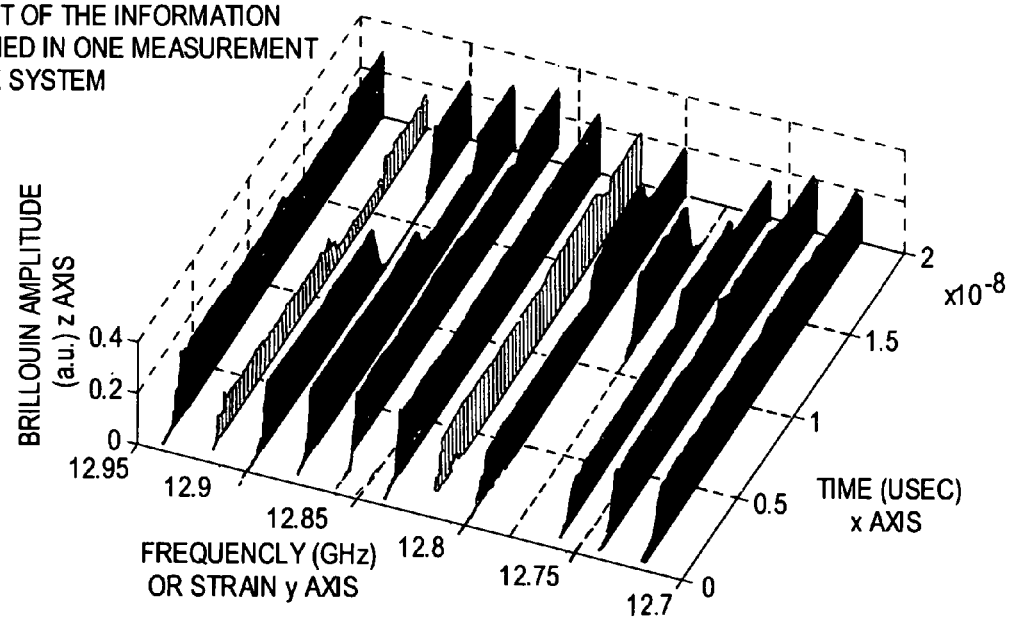

For the case of large signal variations, there is a 100% variation caused due to the Brillouin interaction. However, for this case the system was simulated for one measurement only, corresponding to the solid line spectrum in FIG. 23. The time domain waveform for all the teeth is obtained using the above algorithm. These are then plotted in a 3-D plot with time (x-axis), frequency (y-axis) and Brillouin amplitude (z-axis). As we move along the x-axis, we see how the power of each frequency changes down the fiber. As we move along the y-axis, we observe the Brillouin spectrum for each point on the line. The resulting 3-D plot is shown in FIG. 25.

The Brillouin frequency of the above fiber is 12.78 GHz hence at this frequency, the signal on the entire fiber experiences loss, except for the strained section at around 1.5 μs. This section has a Brillouin shifted frequency of 12.90 GHz and hence there is a loss at this frequency as seen on the third plot along the frequency axis. The new sensing system should be able to obtain all the above information in one measurement and this entire 3-D plot will be updated in short intervals of time to yield dynamic strain changes.

The analysis shown above is visually informative because the artificial Brillouin profile was normalized to have a minimum of 0 and thereby have a 100% change between the minimum and maximum in FIG. 18. But in actual experiments, the Brillouin information is 40-50 dB below the carrier. This corresponds to 0.01%-0.001% variation due to Brillouin interaction, as shown in FIG. 26. Hence a separate analysis needs to be done to prove that this detection scheme will be able to detect very small changes also.

Both these cases are combined into one and an analysis similar to the previous case is followed for the Brillouin interaction and the signal detection. To observe very small changes, the time domain signal for each comb tooth after Brillouin interaction was subtracted from the original AM time domain signal for the same frequency in addition to the processing steps in FIG. 24. The figures were then plotted alternately.

Figure 27:
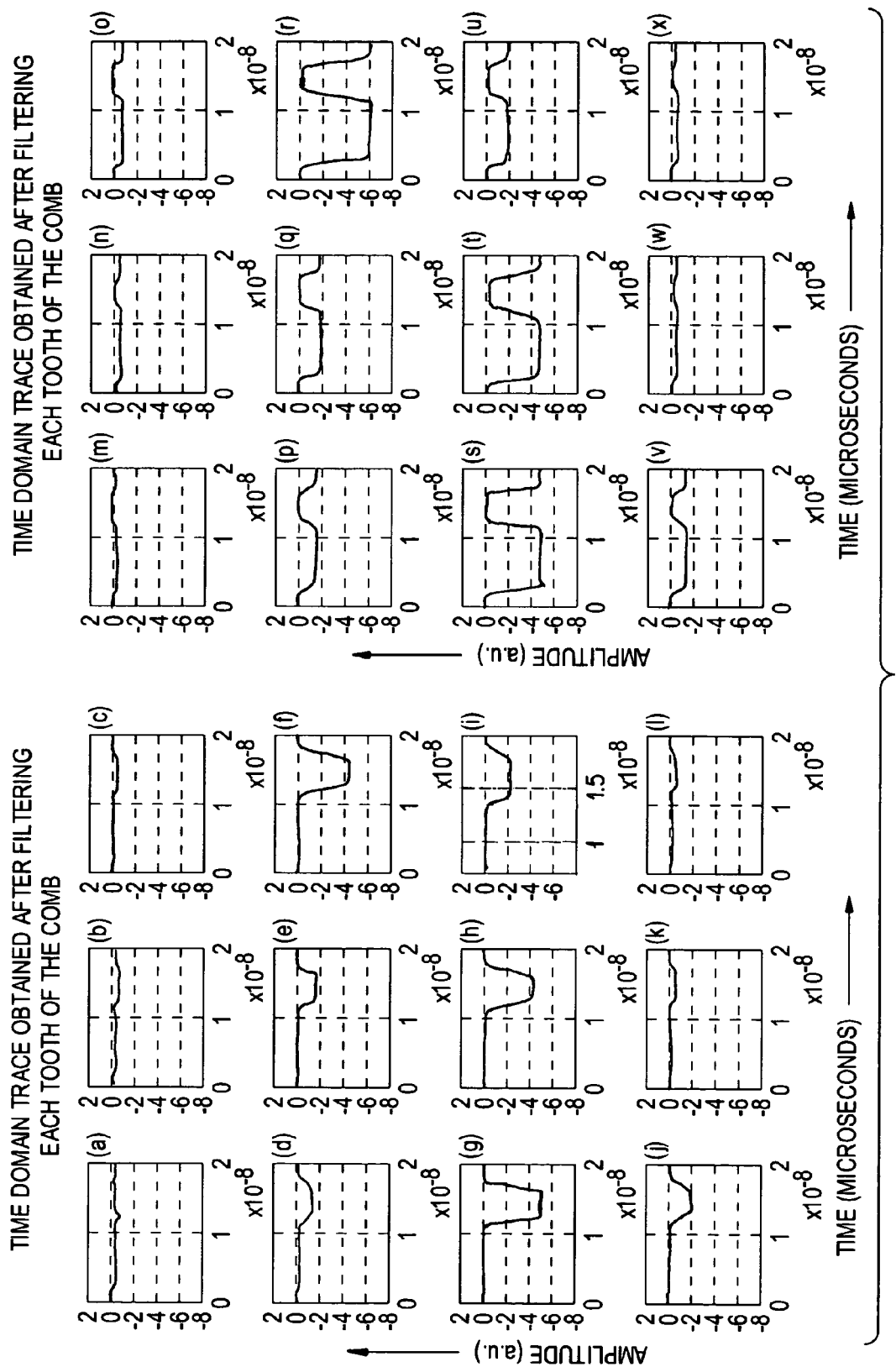
FIG. 27 Time domain waveforms for each frequency tooth obtained after simulation.

In FIG. 27, a),c),e),g),i),k),m),o),q),s),u),w), correspond to solid line spectrum in FIG. 23 (relative comb frequencies of 20 MHz, 40 MHz, 60 MHz . . . etc.). Figure b),d),f),h),j),l), n),p),r),t),v),x), correspond to the dotted line spectrum in FIG. 23 (relative comb spacing of 10 MHz, 30 MHz, 50 MHz, etc.) corresponding to the next measurement.

From FIG. 27 (a)-(l), we notice that the signal around 1.7 μs decreases progressively and then comes back to zero. This is because at 12.90 GHz, the signal at around 1.7 μs experiences loss and decreases; hence the difference is negative. From FIG. 27 (m)-(x), we notice that all other points on the fiber except the signal around 1.7 μs experience loss because 12.78 GHz corresponds to their Brillouin frequency. Moreover, the small change in the signal profile is seen more clearly by combining the graphs obtained by using the two profiles of FIG. 26. Also, in the simulations for both the large and small signal variations, only the lower sideband was undergoing the Brillouin interaction. Hence, there are only 12 waveforms in FIGS. 25 and 12 waveforms for each of the 2 measurements in FIG. 27.

The sensing system was modeled by characterizing the modulator, followed by the explaining the steps used in the simulation for the generation of the Brillouin interacted signal. Heterodyne detection mechanism was simulated. Post-detection processing was performed using a novel algorithm and it was found to be effective in extracting the information from the signal even when the changes were very small. The simulations also showed the potential of the system for dynamic measurements because a 3-D graph was obtained with time, frequency (or strain) and Brillouin amplitude for the entire fiber in a single measurement.

The theoretical and practical investigations of the previous chapters are implemented and measurements on the BOTDA system at the Optical Fiber Systems Lab (OFSL) at UNB are performed, both with and without these improvements.

Figure 28:
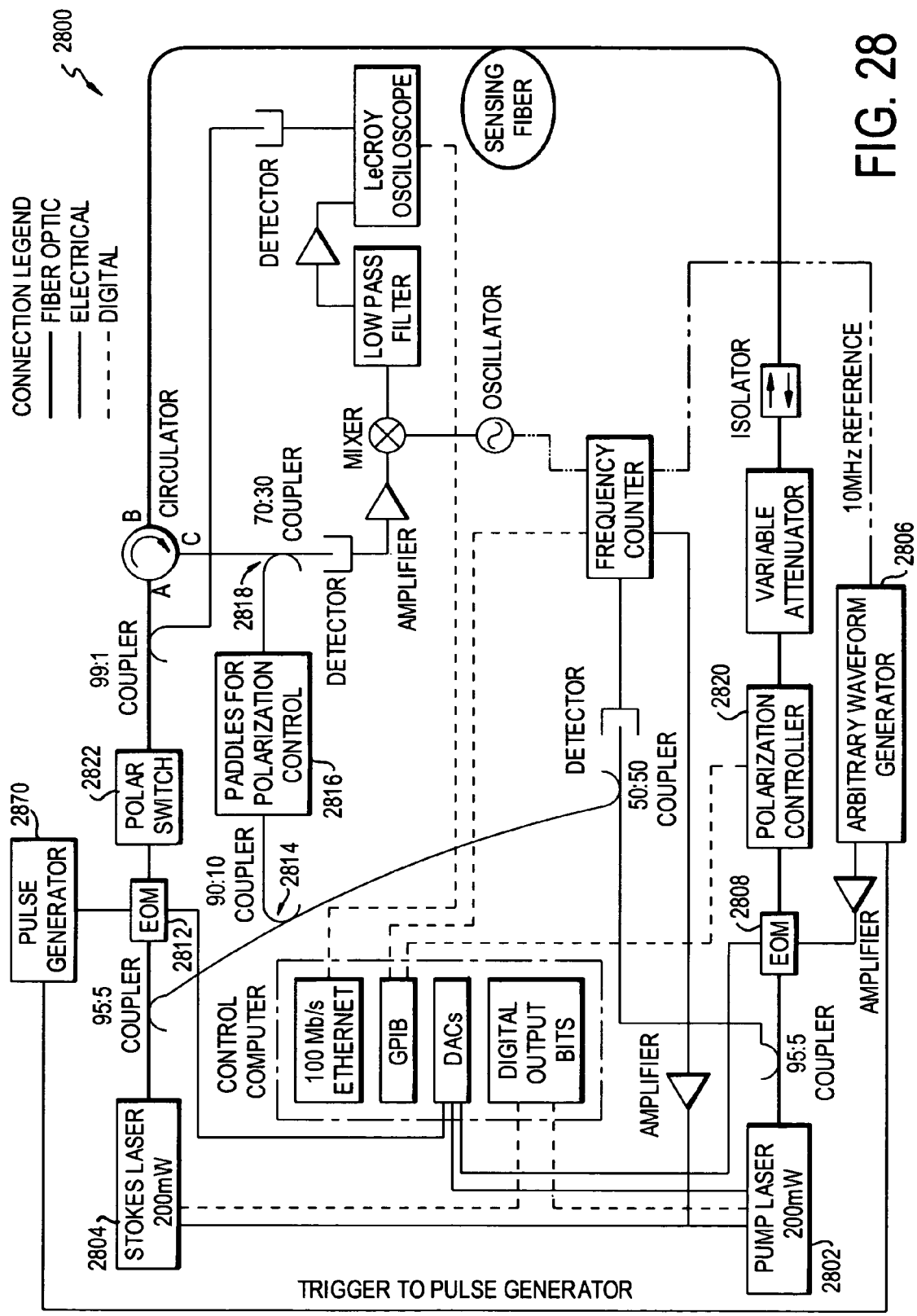
FIG. 28 Coherent Parallel Receiver Brillouin Sensing system.

In the new system, shown in FIG. 28 as 2800, the pump laser 2802 is amplitude modulated by a random phase summation of sinusoids. The receiver is a coherent heterodyne detection system in which the Stokes laser 2804 acts as the L.O. All measurements using the new system are done by manually changing the frequency of the lock box because NTControl was not configured to automate the system at this stage.

The AWG 2806 (Tetronix model no. AWG 520) is used to produce a summation of random phase sinusoids by writing a program in it. This signal is in turn fed to the RF port of the EOM 2808. Initially, the amplitudes of all the frequency terms were equal. The second channel of the AWG outputs trigger signals to the pulse generator 2810 so that both the pump and Stokes laser are synchronized and interact at the same relative position with each pulse sequence.

The 5% output of the 95:5 coupler 2812 at the Stokes laser end is split using a 90:10 coupler 2814. The 10% output is fed into a set of paddles 2816 which can be adjusted to change the polarization of the Stokes signal to match that of the Brillouin interacted pump. The output of the paddles is coupled with the Brillouin interacted pump signal using the 70% arm of a 70:30 coupler 2818 for heterodyne detection.

In the original system, a polarization controller 2820 was used to change the state of polarization of the pump laser to take measurements in two orthogonal polarizations. By averaging the two measurements, interaction between co-polarized pump and Stokes signals could be assured even though the polarization changes with bending and twisting of the fiber.

Now, a General Photonics PSW-001 fiber optic polaswitch 2822 is placed at the output of the EOM at the Stokes laser end. When +5 V DC is applied to the switch, it has one polarization state and when −5 V is applied, it produces an orthogonal polarization. This has two distinct advantages over changing the polarization of the pump laser.

First, the time of measurement between the two orthogonal polarization states is reduced because only the power supplies to the switch have to be interchanged. The switching time of the polaswitch is 100 µs. Hence the system can be automated by applying a periodic square wave to change the polarization, which is limited only by the switching speed of the polaswitch. If the polaswitch were not there, then the polarizations would have to be changed using the 4 settings of the polarization controller using the computer for the two orthogonal measurements. Thus, there are less chances of the polarization to change between the two measurements.

Second, the original method was suitable for direct detection and was also automated to flip the polarizations fast. But in heterodyne detection, the polarization states of the L.O. and the signal should also be aligned completely. If we continued to use the original method, a separate polarization controller would be required to be placed at the output between the circulator output and the 30% arm of the 70:30 coupler. Each time the polarization of the pump laser was flipped at the input, this polarization controller would have to do a corresponding change in polarization to match the state of the Brillouin interacted signal to that of the L.O. But now by keeping the state of the pump signal constant, we are required to set the paddles only once to match the polarization of the Stokes wave to that of the pump because now the two lasers will always be aligned for both the orthogonal measurements.

The first step in the experiments would be to find the pulse width of the Stokes laser to be used because this will in turn govern the comb teeth spacing.

The Electrical bandwidth of the system is given by:

$$B.W. = \frac{0.35}{t_r} \quad \quad 5.1$$

where $t_r$ is the time it takes to reach from 10% to 90% of the final value.

When the Electrical Spectrum Analyzer is used as a heterodyne receiver in zero span mode, it has a resolution bandwidth $\leq 3$ MHz. Therefore, $t_r \geq 116.67$ ns Hence, the pulse width should be greater than 116.67 ns.

The above result was also confirmed experimentally. For this, AM was carried out with only 2 sidebands 20 MHz apart from the carrier on an SMF-28 fiber which was 120 m long. The frequency difference was adjusted such that the lower sideband was at the Brillouin frequency of 12.78 GHz. The F.F.T. of the waveform was taken on the scope and the resulting waveform captured. These measurements were taken for different pulse widths of 20 ns, 40 ns, 60 ns, 90 ns, 120 ns. The Electrical L.O. was adjusted such that the final signal was centered at 320 MHz. In order to get a smoother profile, 7 measurements were taken for each pulse width and the average of the Fourier transform was taken before plotting in MATLAB. The plots are shown in FIGS. 29 through 31(b)

Figure 29:
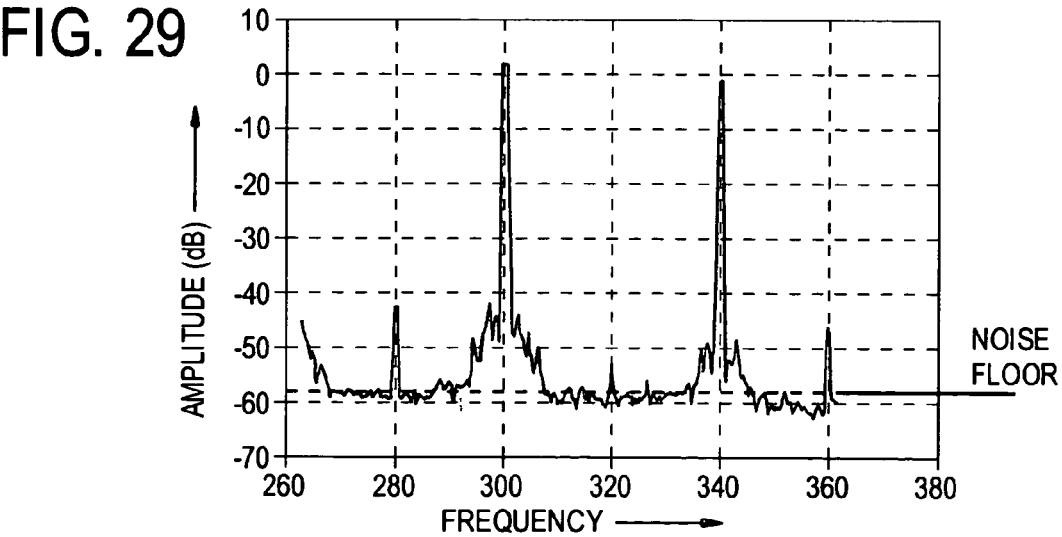
FIG. 29 Frequency Spectrum of the Brillouin interacted signal.

From FIG. 29, it is clear that the Brillouin information is 40-50 dB below the peak value of the comb and the noise floor of the display appears as 60 dB below the peak. This corresponds to a change of 0.01%-0.001% due to the Brillouin interaction. Hence, the receiver should have enough dynamic range to be able to detect these changes.

Figure 30:
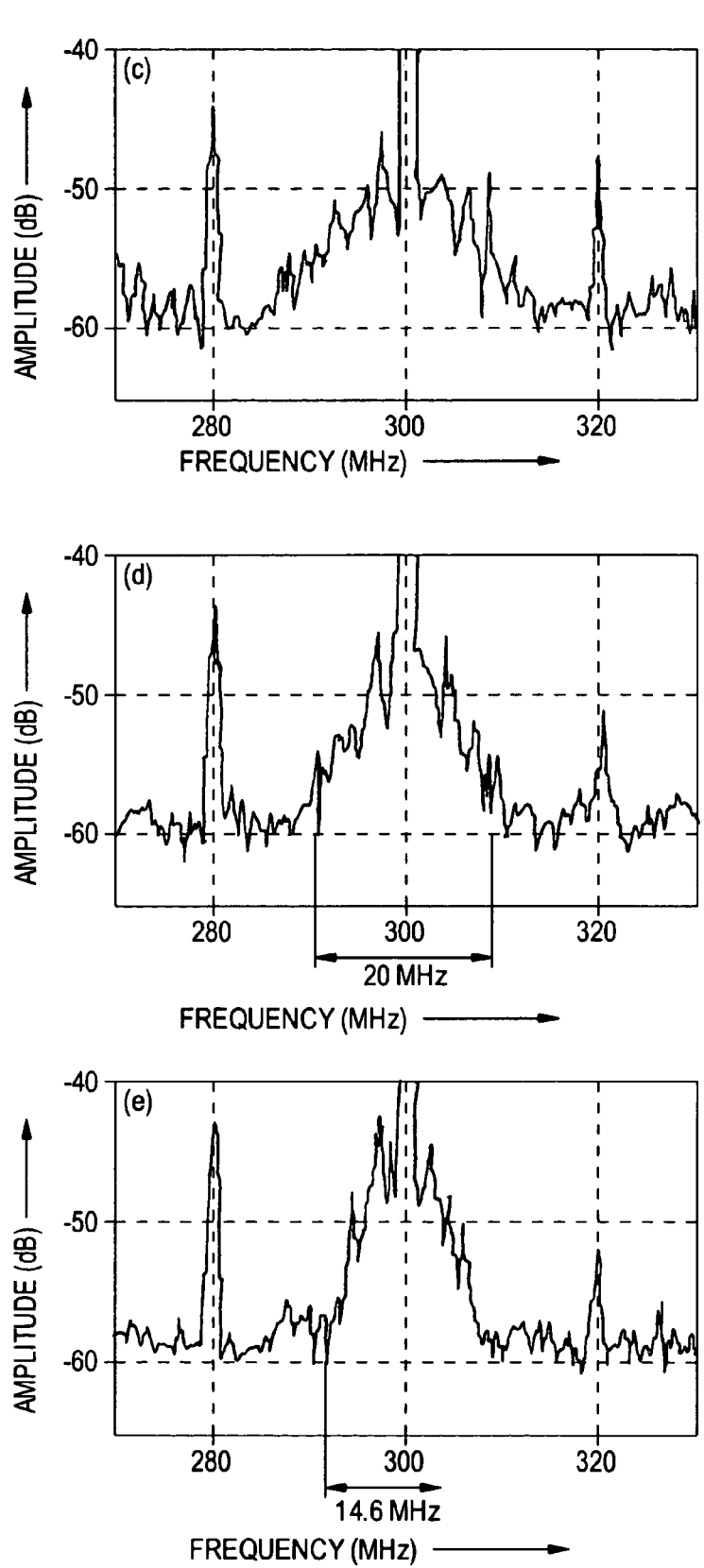
FIG. 30 Zoomed in spectrum for the comb tooth at the exact Brillouin frequency difference for a range of pulse width excitations.

As seen in FIG. 30, for pulse widths of 20, 40 and 60 ns, the spreading in linewidth due to the Brillouin interaction is more than 20 MHz, thereby extending the response into the next tooth. Hence, even if we place the comb teeth 30 MHz apart, there will be overlapping of information from adjacent teeth. For FIGS. 30(d) and (e), the signal bandwidth appears to be 20 MHz or less. So the 120 ns pulse was chosen so as to avoid interaction with adjacent teeth.

The first step was to establish a reference set of data using the automated stepped frequency BOTDA system shown in FIG. 1.

Temperature sensing was used in the initial steps because it is much easier to get uniform temperature sections which are very long. The system was tuned from 12.70 GHz to 13.05 GHz in steps of 5 MHz.

A 24 m section of the fiber near the Stokes laser end and a 24 m section of the fiber near the pump laser end were placed inside a temperature controlled box with a 48 m section between the cooled ends remaining at room temperature. This 48 m section also had a 4 m strained section at its center. The temperature control box was set to cooling to a temperature of −15° C. A length of 24 m was chosen because a 120 ns pulse corresponds to a spatial resolution of 12 m, so we chose double the length to get more than one point in the cooled section in the final results. Pulsewidths of 10 ns and 120 ns were used to confirm that the 120 ns pulse did indeed provide results.

Since the two 24 m fiber sections were cooled, the Brillouin frequency shifted down to 12.72 GHz. This is clearly seen by the 2 dips at around 200 ns and 1000 ns in FIG. 31(a). In FIG. 31(b), at 12.78 GHz, the rest of the fiber experiences loss whereas the signal in the two cooled section remains the same. The 10 ns signal has much more detailed information due to the larger bandwidth. Moreover, the 120 ns case in FIG. 31(b) shows a small peak at the center of the 48 m room temperature section. This peak corresponds to the 4 m strained section and hence the 120 ns does not completely lose the information about sections shorter than its pulsewidth.

Having established the reference set of data, the system is connected as shown in FIG. 28, except that the output of the photodetector is connected directly to the ESA. For these measurements, we used AM with only two sidebands 40 MHz offset from the carrier. The video output of the ESA was connected to the oscilloscope. The video output is the signal obtained after envelope detection of the waveform. When the ESA was used in the zero-span mode, it acted as a fixed-tuned heterodyne receiver. The Resolution Bandwidth (RBW) of the ESA determined the bandwidth of the bandpass filter through which the tooth was passed. This was set to the maximum value of 5 MHz. As seen from FIG. 30(e), the spread in information extends beyond 5 MHz and hence, there may be loss of some information, but it does give a band limited view of the information. The Video Bandwidth (VBW) of the ESA determines the bandwidth of the lowpass filter after the detector. This was also set to the maximum value of 3 MHz.

The pulse width used was 120 ns. The frequency difference was set to be 12.76 GHz and 12.82 GHz in two separate measurements, so that the lower sideband was at a frequency of 12.72 GHz and 12.78 GHz, respectively.

Figure 31A:
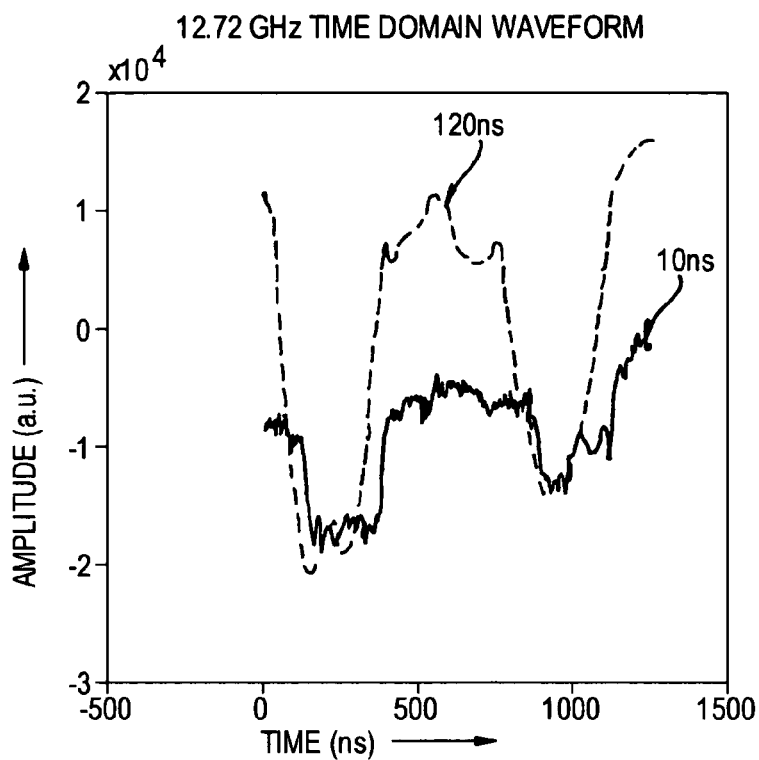
FIG. 31(a) Output waveform at the Brillouin frequency of the cooled section at 12.72 GHz.
Figure 31B:
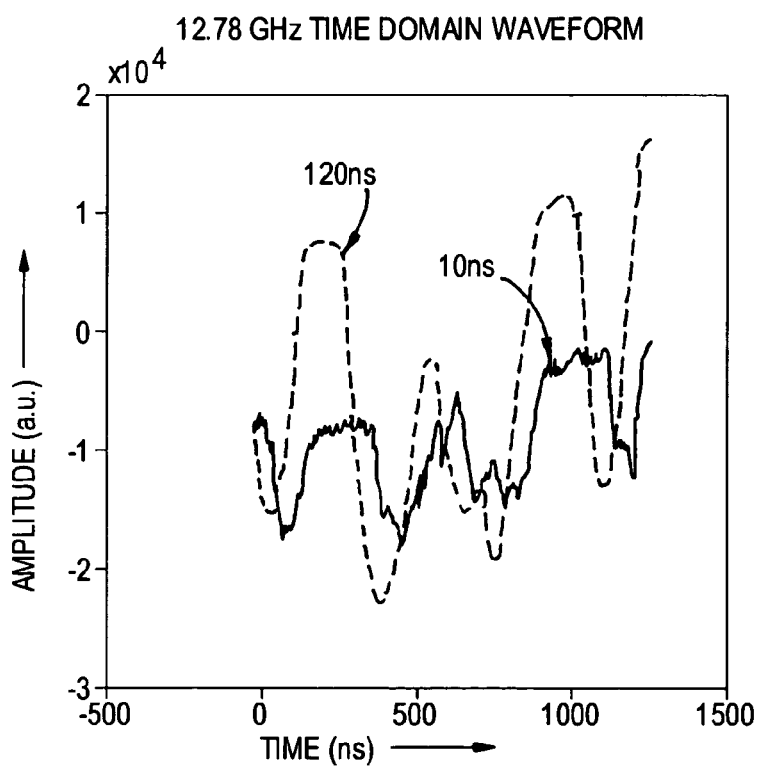
FIG. 31(b) Output waveform at the Brillouin frequency of the normal fiber at 12.78 GHz.
Figure 32A:
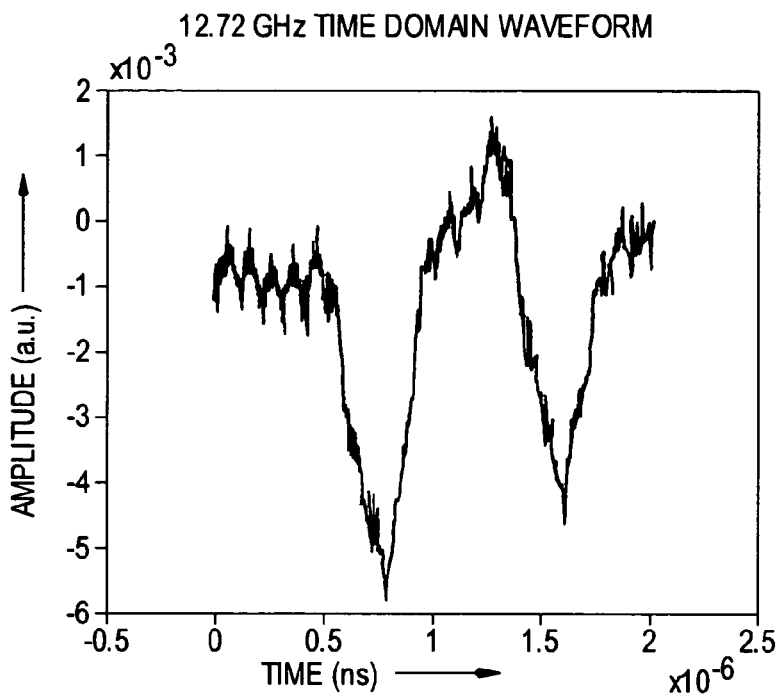
FIG. 32(a) Waveform obtained using ESA as receiver in zero span mode at 12.72 GHz.
Figure 32B:
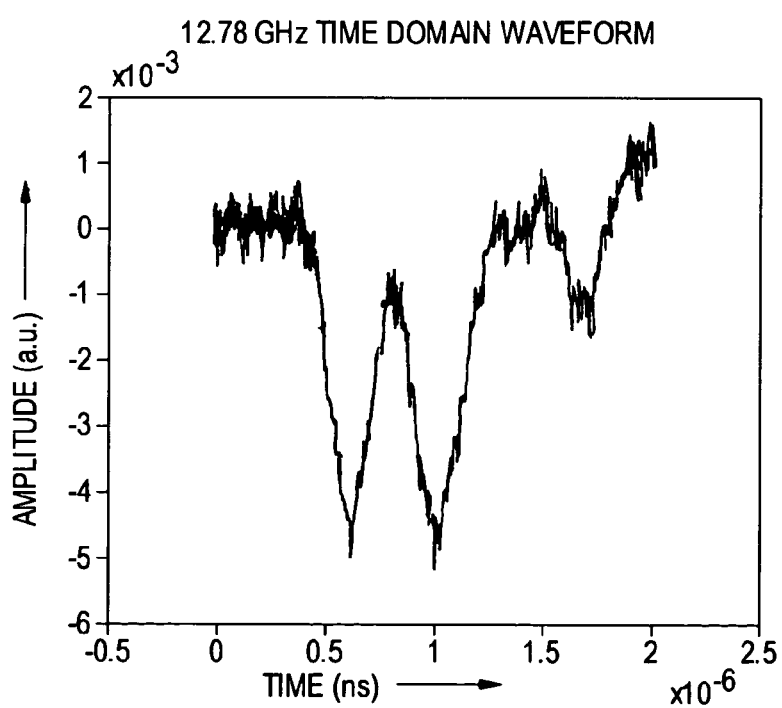
FIG. 32(b) Waveform obtained using ESA as receiver in zero span at 12.78 GHz.

FIG. 32(a) is similar to FIG. 31(a). As seen in the above figure, at 12.78 GHz, the signal along the entire fiber undergoes loss except for the two cold sections. Another important thing noticed was that even when the figures were plotted for one polarization, they did not differ significantly from those obtained by polarization averaging. The limited bandwidth of the ESA produces the triangular shapes seen in FIGS. 32(a) and (b) as opposed to the faster rise times seen in FIGS. 31(a) and (b).

The above experiment confirms that a coherent heterodyne receiver with a large dynamic range can extract the Brillouin information from the system.

Figure 34A:
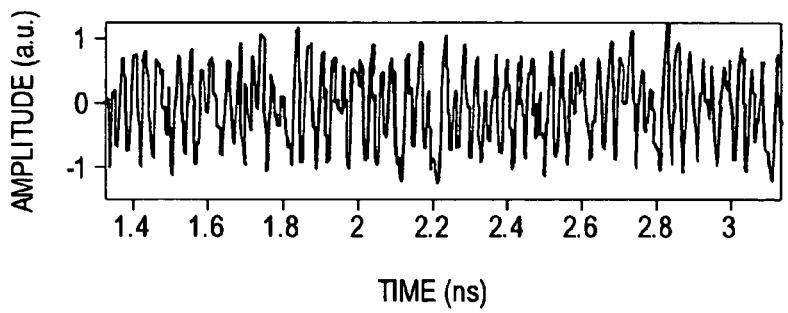
FIGS. 34(a)-(g) Waveforms obtained after each step of the algorithm.

Having demonstrated that data from a single tooth can be captured and processed and the Brillouin information extracted, we extend this to the entire comb. In this parallel receiver configuration, the optical comb on the pump laser signal is coherently detected and electrically mixed down to 300 MHz as shown in FIG. 34(a). The entire comb is captured on the oscilloscope and through DSP the data on each tooth is extracted.

The data obtained from the new system configuration is in the form of a summation of sinusoids with random phase and additional post-processing is required to extract the information. The Brillouin information is approximately 40 dB below the sinusoid amplitude and is thus challenging to recover.

Figure 33:
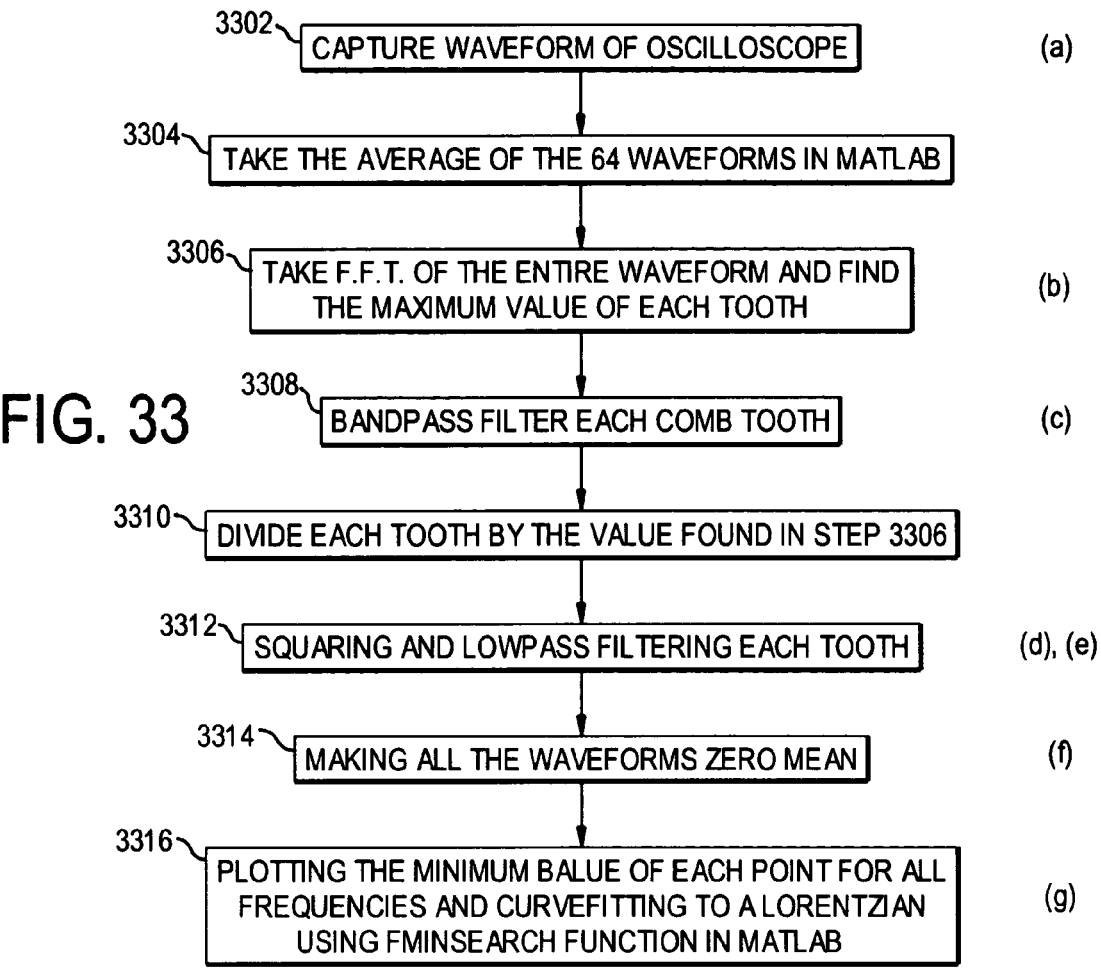
FIG. 33 Flowchart for the algorithm used for post processing.

The basic algorithm used for simulation is shown FIG. 24. In addition, more processing was done on the experimental data, as shown in FIG. 33. The overview of the steps is:

Step 3302, capture waveform on oscilloscope (corresponds to FIG. 34(a)).

Step 3304, take the average of the 64 waveforms in MATLAB.

Figure 34B:
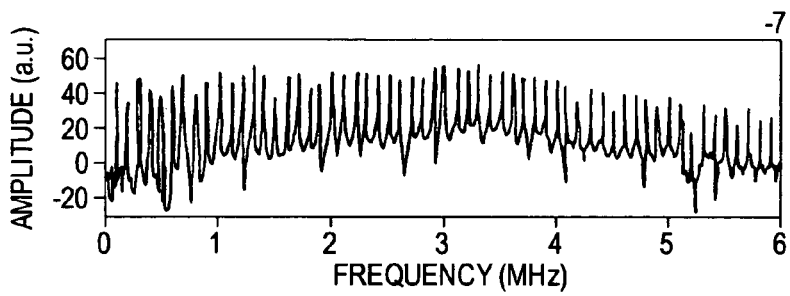

Step 3306, take the FFT of the entire waveform and find the maximum value of each tooth (corresponds to FIG. 34(b)).

Figure 34C:
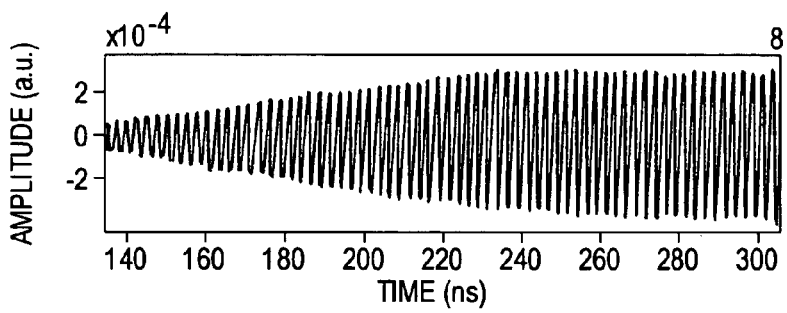

Step 3308, bandpass filter each comb tooth (corresponds to FIG. 34(c)).

Step 3310, divide each tooth by the value found in step 3306.

Figure 34D:
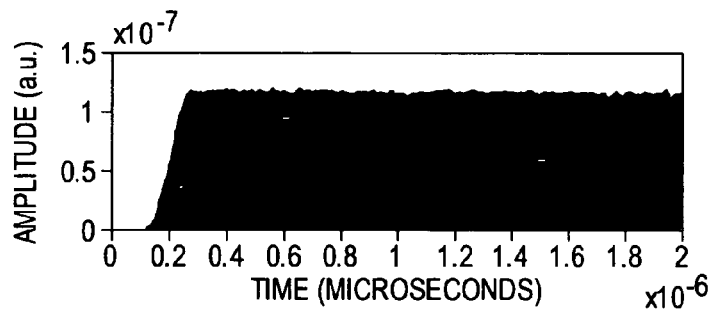
Figure 34E:
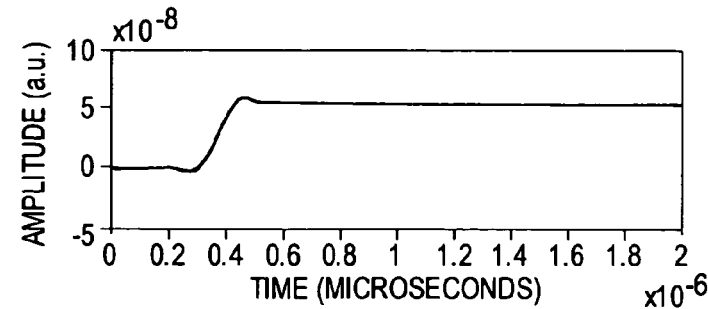

Step 3312, square and lowpass filter each tooth (corresponds to FIGS. 34(d) and (e)).

Figure 34F:
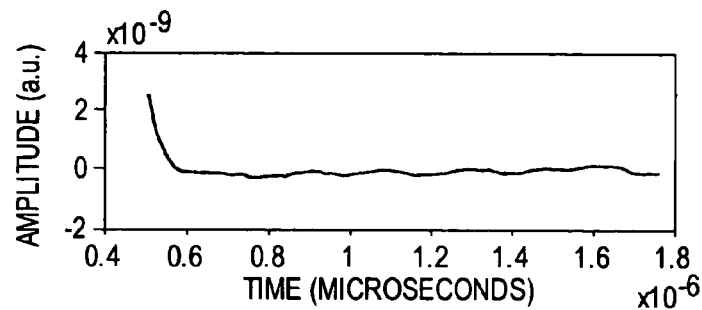

Step 3314, make all of the waveforms zero mean (corresponds to FIG. 34(f)).

Figure 34G:
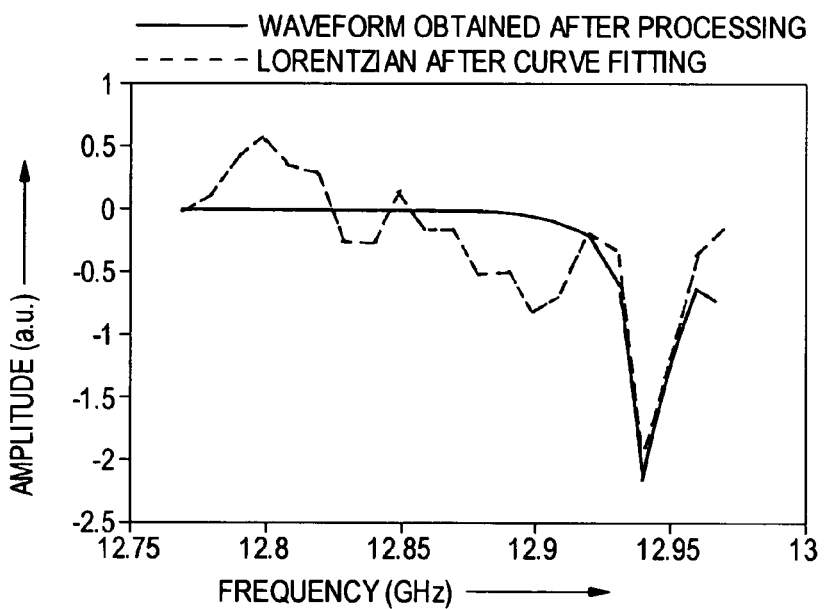

Step 3316, plot the minimum value of each point for all frequencies and curve-fit to a Lorentzian (corresponds to FIG. 34(g)).

The waveforms obtained in each step are shown in FIGS. 34(a)-(g). The scope was run in sequence mode with 64 sequences, and the post-processing outside the scope similar to the ESA.

Figure 35A:
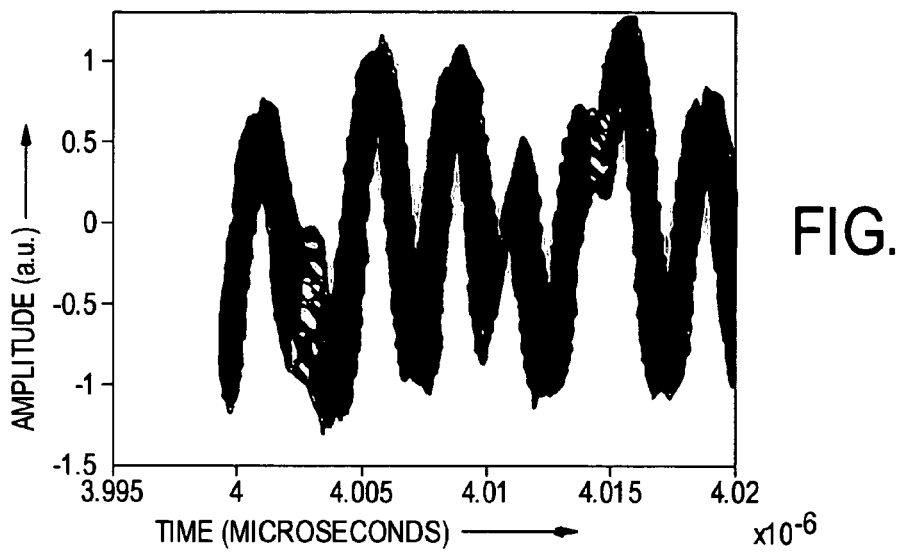
FIGS. 35(a) and (b) 64 waveforms of a sequence superimposed on each other.
Figure 35B:
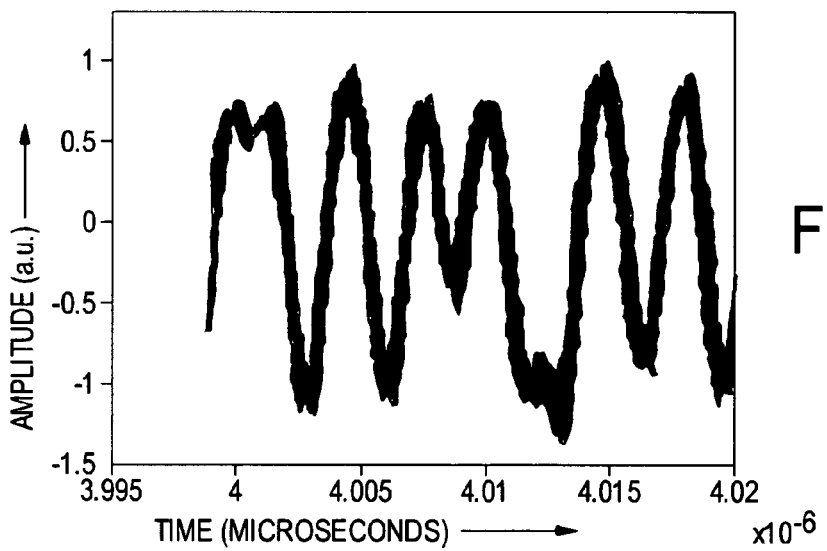

The XL microwave lockbox was replaced with an EIP model 575 source locking microwave counter for the new system because it allowed a larger number of sequences to be taken without losing phase lock. This was confirmed by plotting each of the 64 waveforms of one of the sequences on top of each other and observing the shift. Each of the 64 waveforms had a period of 2 μs. The XL microwave unit showed a lot of phase variation as compared to the EIP unit as shown in FIGS. 35(a) and 35(b).

It is very important that the whole system is phase-locked for these measurements; otherwise, averaging of the detected signal to improve SNR will yield zero due to random phase. For this, a 10 MHz reference signal from electrical L.O. was fed into the lockbox and the AWG. The AWG delivered a trigger signal every 40 μs on Channel 2, while the comb was running continuously on Channel 1.

The most important thing for testing the new system is to have uniform strain or temperature along the entire length of the strained/temperature section. The temperature control box was heated to 50° C. The system was first run using the direct detection receiver and data acquired using the original system using NTControl to establish a reference set. Next the heterodyne receiver was connected.

The pump signal consisted of 21 teeth including the carrier, spaced 10 MHz apart as shown in FIG. 34(b). The lasers were tuned to a frequency difference in the region outside the Brillouin interaction (13.60 GHz) and the different frequencies were premultiplied in the AWG by different scaling factors to get a relatively flat spectrum. Leveling the comb teeth allows each tooth to operate at the maximum power, just below the stimulated scattering point. The carrier amplitude was adjusted by changing the D.C. bias of the modulator.

The output was then connected to the oscilloscope and the laser frequency difference was tuned back to the Brillouin interaction region of 12.82 GHz. The oscilloscope was operated in single acquisition mode and acquisitions were taken repeatedly until a good amplitude signal was obtained, implying phase lock. The averaged waveform was captured. After this, the polaswitch supply leads were interchanged and an acquisition taken for the orthogonal polarization. The laser frequency difference was changed to 12.825 GHz and the above measurement repeated. This corresponded to taking data at frequencies in between the frequencies for the previous case to get 5 MHz steps. Measurements were also taken at differences of 13.03 GHz, and 13.035 GHz for both orthogonal polarizations in each case. This gave a continuous spectrum from 12.82 GHz to 13.135 GHz in steps of 5 MHz. Post processing was performed using the algorithm of FIG. 24.

The sections from approximately 200 to 400 ns and 900-1100 ns correspond to the heated part of the fiber and hence they have a higher frequency Brillouin frequency of around 12.81 GHz. The section from 600-700 ns was a strained section but it was less than the pulse width and hence it does not show clearly. The other sections have the normal Brillouin frequency of around 12.78 GHz. The pulse width used was 120 ns.

Figure 36:
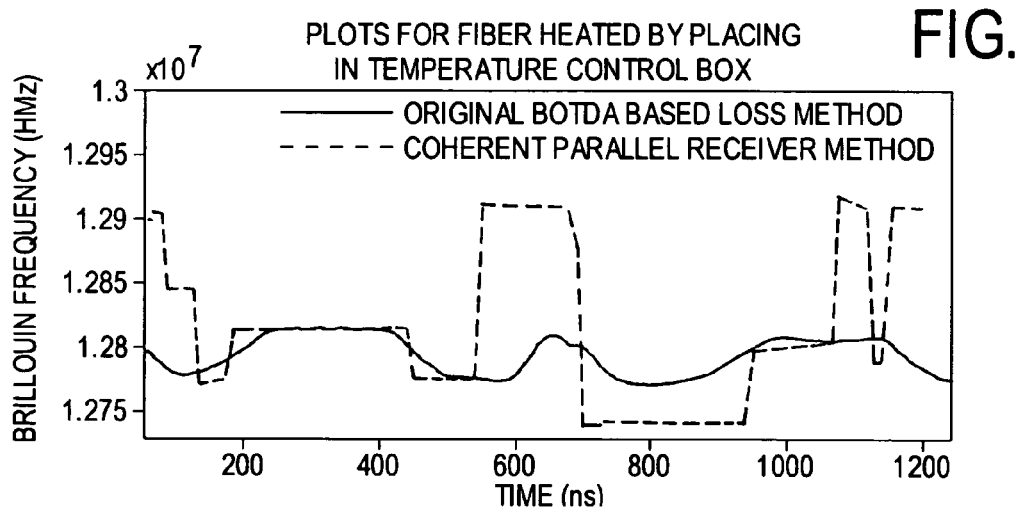
FIG. 36 Plots of the Brillouin frequency at every point on the fiber using coherent Parallel receiver for temperature measurements and averaging on the scope.

From FIG. 36 it is clear that the results from the new system closely match those from the original BOTDA system for the initial part of the fiber but for the latter part they tend to drift a little. It is observed the dotted line has sharper edges than the solid line. This does not necessarily imply that the new system is more accurate.

The next steps involved making the system work for the static strain case and observing the Brillouin spectrum. A setup shown in FIG. 37 as 3700 was used. For this case, a 120 m SMF-28 fiber length having a Brillouin frequency at around 12.78 GHz was used. A 20 m length of OFS Depressed Clad fiber having a Brillouin frequency at 12.804 GHz was spliced near the pump laser end. The Depressed Clad fiber did not have any jacket on it so it would be easier to apply uniform strain on it. A 17 m OFS fiber section 3702 was placed in a straight line and fixed at one end. The other end was connected to a rotating wheel 3704 to provide periodic strain. The wheel was placed in one of the following four positions A, B, C, or D and a measurement taken at each using the original system configuration 3706 and with CPR. This establishes a reference set of data.

The acquisition sequence for this measurement is as follows:

a) The AWG delivers a trigger signal to the pulse generator every 2 µs b) The comb signal is output on channel 1 first and 4 µs later, the first trigger signal to the pulse generator starts;

c) Subsequently, the AWG outputs 64 trigger signals over the next 128 µs and then stops.

d) This constitutes an acquisition sequence that is repeated following a 2 s delay.

The advantage of this is that when the wheel is rotating, 64 waveforms can be acquired after every 2 s movement and each set of 64 waveforms will have data for one position which can be averaged separately. The value of 2 µs was chosen because of the following reasons.

First, the two ways travel time of the pulse on the fiber is around 1.4 µs. Hence, anytime after this, the next pulse can be sent for the next Brillouin interaction. Initially, the system was being pulsed every 40 µs, which resulted in much dead time.

Second, the line width of the lasers is $\Delta v < 5$ kHz/ms. Hence the coherence time is $$\tau_c = \frac{1}{\pi \Delta v}$$

$$\tau_c > 63.69 \; \mu s$$

Thus, with triggers every 40 µs, the total time for 64 pulses would be 2560 µs. This is enough time for the lasers to fall out of phase lock.

Third, this also makes the overall system fast because now theoretically, strains can be measured after every 128 µs corresponding to a vibration frequency of 3.9 kHz for Nyquist sampling.

Figure 38:
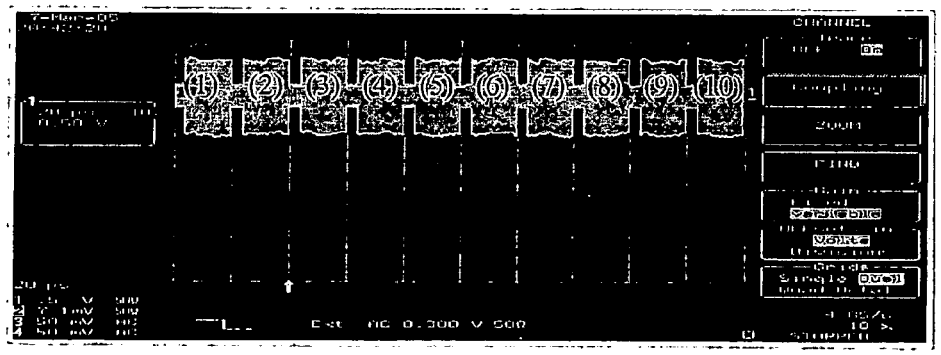
FIG. 38 Time Domain waveform obtained after Brillouin interaction.

The reference data was first obtained for the static strain case using the NT Control system. Then the CPR was connected and measurements were taken at a frequency difference of 12.87 GHz between the two lasers and a single polarization. The pulse width was 120 ns. A typical capture of the time domain waveform on the oscilloscope screen is shown in FIG. 38.

Since the oscilloscope is run in sequence mode, there are 10 sequences of 128 µs each having 64 waveforms. The bottom trace is the pulse sequences from the Stokes laser which are synchronized with the top trace.

Figure 39A:
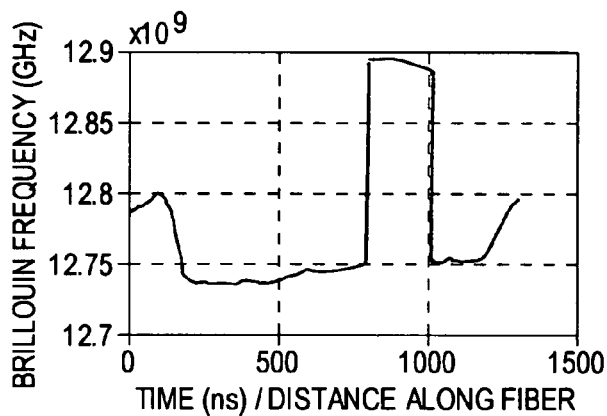
FIG. 39(a) Brillouin frequency of all the points for the case of nearest position using original system.
Figure 39B:
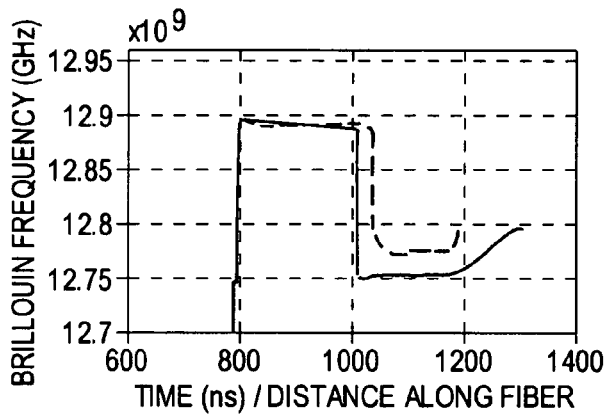
FIGS. 39(b), (c),(d) Zoomed plots for region around the strained section.
Figure 39C:
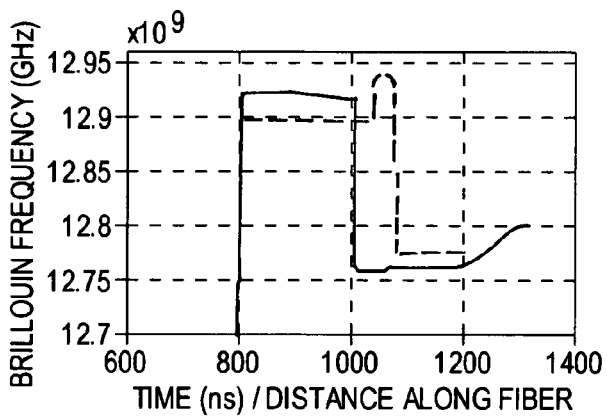
Figure 39D:
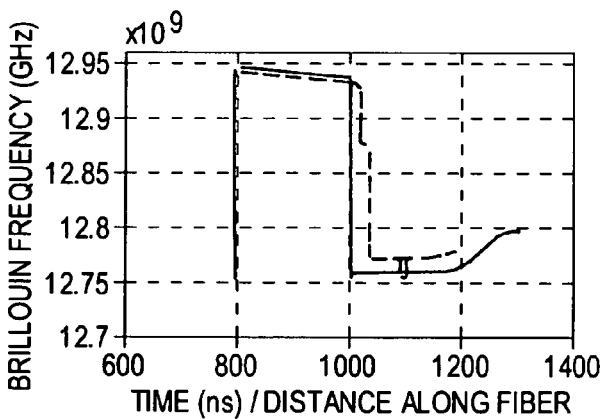

After processing using the steps in FIG. 33, the waveforms were obtained. In FIG. 39(a), the Brillouin frequencies for the entire fiber for position A were plotted showing the strained section clearly. As we move from FIG. 39(b) to (c) to (d), it is observed that the Brillouin frequency for the strained section shifts from 12.89 GHz to 12.935 GHz corresponding to minimum to maximum strain shift. The plots also closely match those obtained using the direct detection system. Since these measurements are for the static case, all the 10 sequences in FIG. 37 should contain the information about the same position. This was confirmed by plotting the waveforms from all the sequences.

The final step involved taking dynamic strain measurements. For this, the wheel in FIG. 37 was rotated at a speed of 12 s per cycle. This is because rotating it faster would result in polarizations changes and since the measurements were taken for only single polarization, faster rotations would result in loss of data. The wheel was set to the nearest position and rotated and a measurement was taken for 10 sequences on the scope with 1.2 µs between each sequence. Point 10 in FIG. 40 corresponds to the position of lowest strain.

Five sets of measurements were taken using the above setup. For each measurement, the wheel was brought to the nearest position and then started and the data captured for one cycle. Then the above process was repeated again.

The values obtained from the measurements were in the units of frequency (GHz). These had to be converted to strain values before plotting. The Brillouin frequency of the Depressed Clad fiber is 12804 MHz. The temperature and strain coefficient of the fiber are 1.66 MHz/° C. and 0.9566 MHz/µε. The temperature of the room where the fiber was kept was 7° C. Assuming the normal room temperature to be 27° C., this means that the Brillouin frequency is shifted to:

$$12804 - \{(27-7) \times 1.66\} = 12770.8 \; \text{MHz}.$$

The average Brillouin frequency for the position of maximum and minimum strain from all the measurements was found to be 12936 MHz and 12889 MHz. Hence the strain values are:

$$\text{Maximum Strain position: } \frac{(12936 - 12770.8)}{0.0566} = 2918.7\,\mu\varepsilon$$

$$\text{Minimum Strain position: } \frac{(12936 - 12770.8)}{0.0566} = 2088.3\,\mu\varepsilon$$

The strain change is thus =2918.7−2088.3=830.4 με

The data obtained from experiment was processed using the algorithm in FIG. 33. Next a single point in the region near the center of the strained section of the fiber was picked and its Brillouin frequency was plotted for all the 10 strained positions shown in FIG. 40 for each of the 12 measurements. Since the motion of the wheel was circular, the strain profile was expected to be sinusoidal.

Figure 41:
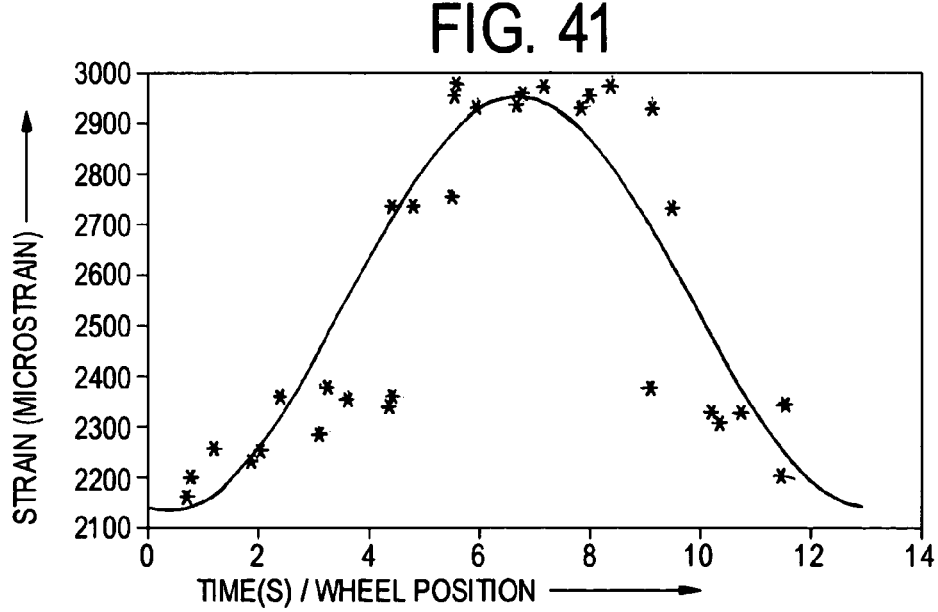
FIG. 41 Strain profile of a point located around 900 ns on the fiber as the fiber is subjected to dynamic strain.

The points in different gray scales in FIG. 41 correspond to different sets of measurements. Each of the points shown above was obtained in 128 μs, hence the new Brillouin sensing system has the potential to update the information at a rate of $$\frac{1}{256 \times 10^{-6}} = 3.9\text{ kHz.}$$

As seen, the data follows the sinusoid closely.

As the wheel rotated, this caused straining of the fiber over a distance of ΔL=1.55 cm. The total length of the strained section was L=17 m. Hence, the strain change was $$\frac{\Delta L}{L} = \frac{1.55 \times 10^{-2}}{17} = 911.76\,\mu\varepsilon$$

Hence, the values obtained from the calculation and experiments are close to each other.

In the dynamic sensing system, the time duration between measurements is very small and there is not enough time to interchange the polarswitch settings between the measurements to get the orthogonal polarizations. Hence, all measurements were taken for a single polarization case only. The changes due to polarization caused errors during the curve fitting because the Lorentzian profile sometimes tried to fit to a frequency outside the actual region.

If the wheel was rotated very fast (at 1.2 Hz), the polarization was found to change drastically and thereby, the shift in Brillouin frequency with position could not be observed. A solution to this problem is to have the whole system to be made of polarization maintaining (PM) fiber. This would have the advantages of always perfectly aligned fields and no need for the second orthogonal polarization measurement. The disadvantages are the high cost of the PM fiber and it will have more loss.

Frequency interpolation was done for the temperature measurement, wherein the second measurement consisted of shifting all the frequencies by 5 MHz from the previous measurement and combining the results of the two. However, in the dynamic sensing system, due to the short time between successive measurements, it was not possible to change the lock box settings fast enough to capture these changes. Another option which was not implemented in the present measurement would be to change the AWG to a sequence mode, wherein it outputs two completely different waveforms alternately at a user specified rate. So for the first 128 μs, it would output a comb at frequencies at say 10 MHz, 20 MHz, 30 MHz etc. and then after a short time (say 10 μs) it outputs a comb at frequencies 15 MHz, 25 MHz, 35 MHz etc for the next 128 μs. Then for the next measurement, this whole sequence would be repeated.

As discussed previously, the Brillouin information has its maximum values 40-50 dB below the comb teeth level. The SNR of an N bit digital sample is given by:

$$SNR(dB) = (6.02 \times N) + 1.76 \quad (5.1)$$

The oscilloscope has only N=8 bits which corresponds to an SNR of 49.9 dB. Now averaging and oversampling on the scope increases the number of bits. The relation is given by:

$$f_{os} = 4^w \cdot f_S \quad (5.2)$$

where $f_{OS}$ is the oversampling frequency, $f_S$ is the original sampling frequency requirement and w is the additional number of bits of resolution obtained.

In the present case, the highest signal frequency coming into the scope was at 400 MHz. Hence the required sampling frequency was 800 MHz; but the sampling was being done at 4 GHz in the scope. Substituting these values in equation 5.2 gives a value of 1.16 for w. Now, the total number of bits available is 9 which increase the SNR to 55.9 dB.

Moreover, an average of 64 waveforms was taken during post-detection processing. Since the SNR varies as the square root of the number of averages, averaging further increased the SNR by a factor of $\sqrt{64}=8$, which gives an SNR of 64 dB.

Thus, there is a severe limitation in the receiver sensitivity even after oversampling and averaging. This was one of the reasons why the spectrum analyzer gave a much better signal at the output without any averaging as compared to the new receiver.

Digital filtering was applied in MATLAB for the post processing of the data. This included both the bandpass filters for extracting each of the comb teeth and the lowpass filter applied following envelope detection. Since the teeth were only 10 MHz apart and there was a frequency spread due to the Brillouin interaction, the bandpass filter must be selected carefully. A 3 dB bandwidth of 8 MHz was chosen for all these filters and the stopband was chosen to be 60 dB below at frequency spacing of 10 MHz from the center. The lowpass filer had a bandwidth of 5 MHz and the stopband at 12 MHz was 60 dB below.

The sharpness of the roll-off from passband to stopband can be improved by increasing the number of filter coefficients. The output of the filter is given by:

$$y[n] = h[n] * x[n] = \sum_{k=0}^{N-1} h[k]x[n-k] \quad (5.3)$$

where h[k] is filter impulse response, x[n] is the input, N is the number of coefficients.

All the registers need to be full before a valid output is obtained at the filter, and this requires N multiply-accumulate cycles per output. So there will be an initial delay in the time domain signal until the registers are full. This will prevent us from obtaining the Brillouin interaction information from the whole line. The problem is further compounded by the fact that after loss of data from the bandpass filter, the signal goes into the lowpass filter and this filter will result in further loss of information because the data coming into it has a shifted starting point. In MATLAB, the size of the band pass filters was 1558 coefficients and the size of the low pass filters was 1448 coefficients. So the total delay in the time domain corresponded to 3006 multiply-accumulate cycles. Hence, a compromise was reached by keeping the comb teeth spacing equal to 10 MHz and having filters with relatively gradual pass band to stop band transition.

Although the EIP lock-box performance in terms of locking was much better than the previous one, it was still not able to perfectly lock the lasers, and hence this might be a source of error when taking the averages.

The post-processing of data forms one of the most important steps in obtaining accurate information about the fiber. The files captured from the oscilloscope are more than 100 MB in size each. These are then taken and processed following the steps shown in FIGS. 24 and 29. The files contain almost 8 million data points. These numbers are obtained as follows:

There were 10 sequences with 64 samples each of 2 µs duration each and sampling was done at 4 Gs/s. This gives $10 \times 64 \times 2 \times 10^{-6} \times 4 \times 10^{9} = 5,120,000$ Points There is an initial delay of 44 µs before each sequence starts and there is an extra 28 µs after the end of each sequence. Hence the points due to these are:

$10 \times (44+28) \times 2 \times 10^{-6} \times 4 \times 10^{9} = 2880004$

The total number of points=5,120,000+2,880,004=8,000,004 points

The delay on the scope was set to be 40 µs implying that the fiber starts after this time. Each 2 µs chunk of data after that corresponds to one measurement and has 8000 points. Thus, if the start point is chosen wrongly, in the worst case, it might include information from 2 separate measurements and lead to errors.

The strained section should not have any splices in it otherwise, prolonged testing might lead to breaking of the connection and hence large reflections. As far as possible, the strain should be uniform all over the section of fiber otherwise there will be multiple peaks in the Brillouin profile thereby, making it difficult to observe the shifts due to dynamic strain. About 28 m of fiber was first wound in 4 turns around two pulleys placed 7 m apart in the lab. But the results were not good because of polarization changes and non-uniform strain. Hence, we moved to a larger room where a single 17 m straight run was strained uniformly but now the length was reduced. When taking multiple measurements, it was necessary to periodically check the spectrum and adjust the modulator bias to compensate for the modulator drift. The amplitude of the comb signal coming out of the AWG should also be carefully controlled.

The Brillouin information was found to be 40-50 dB below the comb teeth and required a highly sensitive receiver for extracting the information. Tests were conducted using ESA as a coherent heterodyne receiver in zero span mode and the fiber temperature was varied and found to give accurate results similar to the automated stepped-sweep direct detection system. Finally, the lock box was changed, the whole system phase locked and dynamic strain measurements taken with a 12 s periodic strain cycle. The Brillouin frequency of the strained section was found to shift over a range of 50 MHz from the minimum to maximum strain position and then come back following a sinusoidal curve over one rotation. The strain change between the two extreme strain positions was found to be 830.4 µε from the Brillouin frequency shift while the direct calculation using the mathematical formula gave a value of 911.76 µε. Thus, modulating the pump signal using a comb of frequencies and then employing a Coherent Parallel Receiver was able to measure dynamic strain changes.

The first detailed investigation of dynamic strain sensing at UNB has been presented in this document. Modulation of the pump laser was introduced to produce multiple frequencies in the same signal. A Coherent heterodyne receiver was employed to extract the Brillouin information and this led to the development of an innovative sensing system which has the capability to measure strains over short intervals of time.

A novel dynamic Brillouin sensing scheme was simulated and tested using BOTDA system at UNB. The pump laser was modulated, a coherent receiver was used and dynamic strain measurements were made when the strain was varied periodically over a 13 s cycle. Each data point was captured in 128 µs. In the future, reduction in the measurement time and increased accuracy can be achieved by using PM fiber, building better sensitivity receiver, and better signal processing.

While the above invention has been shown and described in relation to particular arrangements of optical fibers, and in relation to particular geometries, materials and electronic circuitry, it will be understood by those skilled in the art that various changes or modifications could be made without varying from the scope of the present invention. For example, disclosures of specific numerical values are illustrative rather than limiting. Therefore, the present invention should be construed as limited only by the appended claims.

We claim:

1. A method for sensing a physical condition at a location, the method comprising:
   (a) providing a sensing optical fiber at the location;
   (b) interrogating the sensing optical fiber with a first beam of electromagnetic radiation at a constant frequency;
   (c) simultaneously with step (b), interrogating the sensing optical fiber with a second beam of electromagnetic radiation, the second beam having a spectrum with a comb of frequencies, to cause Brillouin scattering in the sensing optical fiber to produce a Brillouin signal having a Brillouin spectrum;
   (d) receiving the Brillouin signal and deriving the Brillouin spectrum from the Brillouin signal by data acquisition system; and
   (e) deriving the physical condition from the Brillouin spectrum by computing device.

2. The method of claim 1, wherein step (e) comprises deriving the physical condition at a plurality of points along the sensing optical fiber.

3. The method of claim 1, wherein the comb of frequencies is formed by a summation of delta functions.

4. The method of claim 1, wherein the comb of frequencies is formed by a summation of sinusoidal waves.

5. The method of claim 4, wherein the sinusoidal waves have random phases.

6. The method of claim 1, wherein the comb of frequencies has a separation between adjacent teeth in a frequency domain, the separation being selected to exceed an amount of spreading in linewidth of the teeth caused by the Brillouin scattering.

7. The method of claim 1, wherein step (d) is performed using a coherent parallel receiver.

8. The method of claim 1, wherein the physical condition comprises temperature.

9. The method of claim 1, wherein the physical condition comprises strain.

10. The method of claim 9, wherein the strain comprises static strain.

11. The method of claim 9, wherein the strain comprises dynamic strain.

12. A sensing instrument for sensing a physical condition at a location, the sensing instrument comprising:

a first source of a first beam of electromagnetic radiation at a constant frequency for interrogating a sensing optical fiber which is provided at the location;

a second source of a second beam of electromagnetic radiation for interrogating the sensing optical fiber, the second beam having a spectrum with a comb of frequencies, to cause Brilloumn scattering in the sensing optical fiber to produce a Brillouin signal having a Brillouin spectrum;

a receiving element for receiving the Brillouin signal; and a computing device, in communication with the receiving element, for deriving the Brillouin spectrum from the Brillouin signal and deriving the physical condition from the Brillouin spectrum.

13. The instrument of claim 12, wherein the computing device derives the physical condition at a plurality of points along the sensing optical fiber.

14. The instrument of claim 12, wherein the comb of frequencies is formed by a summation of delta functions.

15. The instrument of claim 12, wherein the comb of frequencies is formed by a summation of sinusoidal waves.

16. The instrument of claim 15, wherein the sinusoidal waves have random phases.

17. The instrument of claim 12, wherein the comb of frequencies has a separation between adjacent teeth in a frequency domain, the separation being selected to exceed an amount of spreading in linewidth of the teeth caused by the Brillouin scattering.

18. The instrument of claim 12, wherein the receiving element comprises a coherent parallel receiver.

19. The instrument of claim 12, wherein the physical condition comprises temperature.

20. The instrument of claim 12, wherein the physical condition comprises strain.

21. The instrument of claim 20, wherein the strain comprises static strain.

22. The instrument of claim 20, wherein the strain comprises dynamic strain.

* * * * *